US012733026B2

(12) United States Patent
He et al.

(10) Patent No.: US 12,733,026 B2
(45) Date of Patent: Sep. 8, 2026

(54) SENSING SIGNAL TRANSMISSION METHOD AND APPARATUS

(71) Applicant: HUAWEI TECHNOLOGIES CO., LTD., Shenzhen (CN)

(72) Inventors: Jia He, Chengdu (CN); Ziming Yu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 465 days.

(21) Appl. No.: 18/195,276

(22) Filed: May 9, 2023

(65) Prior Publication Data

US 2023/0284251 A1 Sep. 7, 2023

Related U.S. Application Data

(63) Continuation of application No. PCT/CN2021/128512, filed on Nov. 3, 2021.

(30) Foreign Application Priority Data

Nov. 11, 2020 (CN) ........................ 202011257952.3

(51) Int. Cl.
*H04W 72/541* (2023.01)
*G01S 7/00* (2006.01)
(Continued)

(52) U.S. Cl.
CPC ........... *H04W 72/541* (2023.01); *G01S 7/006* (2013.01); *G01S 7/0235* (2021.05); *G01S 2013/9316* (2020.01)

(58) Field of Classification Search
CPC ......... H04W 4/12; H04W 4/40; H04W 72/21; H04W 72/541; H04W 72/51;
(Continued)

(56) References Cited

U.S. PATENT DOCUMENTS

2009/0163180 A1* 6/2009 Badiger ............ H04M 1/72457 455/412.2
2018/0343556 A1* 11/2018 Wang .................... H04W 72/20
(Continued)

FOREIGN PATENT DOCUMENTS

CN 110261848 A 9/2019
CN 111757280 A 10/2020

*Primary Examiner* — Jean A Gelin
(74) *Attorney, Agent, or Firm* — WOMBLE BOND DICKINSON (US) LLP

(57) ABSTRACT

This application provides a sensing signal transmission method and apparatus, so that transmission of a sensing signal can be coordinated by using a communication resource. This helps reduce interference between sensing nodes. The method includes: A terminal device sends a first message to a network device, where the first message includes information for requesting the network device to allocate a sensing resource to the terminal device. The network device receives the first message from the terminal device, allocates the sensing resource to the terminal device based on the first message, and sends a second message to the terminal device, where the second message includes the sensing resource allocated to the terminal device. The terminal device receives the second message from the network device, and sends a sensing signal on the allocated sensing resource.

20 Claims, 12 Drawing Sheets

(51) Int. Cl.
*G01S 7/02* (2006.01)
*G01S 13/931* (2020.01)

(58) Field of Classification Search
CPC . H04W 72/542; H04W 72/543; H04W 72/56; H04W 72/54; G01S 7/003; G01S 7/006; G01S 7/0232; G01S 7/0235; G01S 7/0236; G01S 2013/9316
USPC .......................................................... 370/329
See application file for complete search history.

(56) References Cited

U.S. PATENT DOCUMENTS

| | | | | |
|---|---|---|---|---|
| 2019/0018408 | A1* | 1/2019 | Gulati | G07C 5/0808 |
| 2019/0349721 | A1* | 11/2019 | Zhu | H04W 4/14 |
| 2019/0364594 | A1* | 11/2019 | Yang | H04W 72/21 |
| 2020/0053563 | A1* | 2/2020 | Birchenko | H04W 8/005 |
| 2020/0100253 | A1* | 3/2020 | Liu | H04W 24/08 |
| 2020/0146053 | A1* | 5/2020 | Tang | H04W 74/006 |
| 2021/0235328 | A1* | 7/2021 | Hui | H04W 72/56 |
| 2021/0385619 | A1* | 12/2021 | Balasubramanian | G01S 5/0289 |
| 2022/0264265 | A1* | 8/2022 | Kwak | H04W 84/005 |
| 2022/0264476 | A1* | 8/2022 | Kim | H04W 92/18 |
| 2023/0199728 | A1* | 6/2023 | Yoshioka | H04W 76/14 370/329 |

* cited by examiner

FIG. 1

SENSING SIGNAL TRANSMISSION METHOD AND APPARATUS

CROSS-REFERENCE TO RELATED APPLICATIONS

This application is a continuation of International Application No. PCT/CN2021/128512, filed on Nov. 3, 2021, which claims priority to Chinese Patent Application No. 202011257952.3, filed on Nov. 11, 2020. The disclosures of the aforementioned applications are hereby incorporated by reference in their entireties.

TECHNICAL FIELD

This application relates to the communication field, and more specifically, to a sensing signal transmission method and apparatus.

BACKGROUND

As sensing nodes such as automotive radars are increasingly widely used, a large quantity of sensing radio frequency spectra turn a city into "electromagnetic wave space", and various sensing nodes are more interfered with. For example, typical interference in the automotive radar may come from mutual interference between radars. Therefore, an interference suppression technology needs to be used to reduce interference between various sensing nodes.

Currently, most basic sensing interference suppression technologies rely on an avoidance method, that is, implement interference suppression by reducing a probability that sensing resources such as space, time, and frequency overlap. For example, a narrow beam and an electronically scanned beam are used to reduce interference in space, a slope of a linear frequency-modulated continuous wave is randomly changed to reduce interference in time, and a start frequency and a cut-off frequency of the linear frequency-modulated continuous wave are randomly changed to reduce interference in frequency.

However, the method can avoid mutual interference between sensing nodes when a quantity of sensing nodes is small, but has a limited effect in a dense radio frequency environment. In other words, when the quantity of sensing nodes is large, mutual interference between sensing nodes still exists, and a probability that a target is detected is reduced.

SUMMARY

This application provides a sensing signal transmission method and apparatus, so that transmission of a sensing signal can be coordinated by using a communication resource. This helps reduce interference between sensing nodes.

According to a first aspect, a sensing signal transmission method is provided. The sensing signal transmission method includes: A terminal device sends a first message to a network device, where the first message includes information for requesting the network device to allocate a sensing resource to the terminal device; the terminal device receives a second message from the network device, where the second message includes the sensing resource allocated to the terminal device; and the terminal device sends a sensing signal on the allocated sensing resource.

It should be understood that the terminal device in an embodiment of the application is an integrated communication and sensing node, that is, the terminal device has both a communication function and a sensing function.

In an embodiment of the application, the first message is used to request the network device to allocate the sensing resource to the terminal device. The sensing resource may be one or more of a hardware resource, a computing resource, a time resource, a space resource, or a frequency resource. The first message may carry any known message for communication between the terminal device and the network device, or the first message may be a newly set message for the communication between the terminal device and the network device. A form of the first message is not limited in an embodiment of the application.

According to the sensing signal transmission method in an embodiment of the application, the network device is used as a resource management center, and the allocation of the sensing resource is coordinated in a communication manner. The terminal device can perform interference-free transmission on the allocated sensing resource, so that signal interference in a network with dense integrated communication and sensing nodes can be effectively avoided. This further improves a probability to detect a target.

With reference to the first aspect, in an embodiment of the first aspect, the first message may further include information indicating that the terminal device has a sensing function.

In an embodiment of the application, the indication information indicating that the terminal device has the sensing function may be used by the network device to specify the terminal device on which resource management may need to be performed. In this way, time overheads and computing overheads of the network device can be reduced.

With reference to the first aspect, in an embodiment of the first aspect, the second message may further include information indicating that the network device allows the terminal device to enable the sensing function.

In an embodiment of the application, the network device may notify, by sending the allocated sensing resource to the terminal device, the terminal device that the network device allows the terminal device to enable the sensing function.

In an embodiment, the second message may also carry an instruction indicating that the network device allows the terminal device to enable the sensing function. After receiving the instruction to enable the sensing function, the terminal device receives the sensing resource allocated by the network device to the terminal device.

With reference to the first aspect, in an embodiment of the first aspect, the first message may further include interference information and a category of the interference information.

In an embodiment of the application, after receiving the interference information and the category of the interference information in the first message, the network device may perform corresponding interference cancellation based on the category of the interference information.

With reference to the first aspect, in an embodiment of the first aspect, when a one-way propagation delay $T_r$ of the sensing signal is greater than a one-way propagation delay $T_c$ of a communication signal, the sensing resource allocated to the terminal device includes a first frame structure, a sensing window of an uplink frame in the first frame structure is used to transmit the sensing signal, a length L of the sensing window meets $2(T_r-T_c)\leq L\leq M$, and M is a length of the uplink frame.

In an embodiment of the application, a sensing receiver may be configured to receive the sensing signal at a full range. That is, whether $T_r>T_c$, or $T_r\leq T_c$, the terminal device having the sensing receiver can receive the sensing signal, and transmit the sensing signal in the sensing window in the communication uplink frame, so that transmission efficiency can be improved and hardware overheads can be reduced.

With reference to the first aspect, in an embodiment of the first aspect, the terminal device sends a third message to the network device, where the third message includes information indicating whether the terminal device has a sensing receiver.

In an embodiment, when the terminal device has the sensing receiver, the terminal device may choose not to enable a receiving function of the sensing receiver, and still transmit the sensing signal in a position of the sensing window of the uplink frame. In this way, the sensing signal can be efficiently transmitted, and hardware overheads can be reduced.

According to a second aspect, a sensing signal transmission method is provided. The sensing signal transmission method includes: A network device receives a first message from a terminal device, where the first message includes information for requesting the network device to allocate a sensing resource to the terminal device; the network device allocates the sensing resource to the terminal device based on the first message; and the network device sends a second message to the terminal device, where the second message includes the sensing resource allocated to the terminal device.

With reference to the second aspect, in an embodiment of the second aspect, the first message further includes information indicating that the terminal device has a sensing function.

With reference to the second aspect, in an embodiment of the second aspect, the second message further includes information indicating that the network device allows the terminal device to enable the sensing function.

With reference to the second aspect, in an embodiment of the second aspect, the first message further includes interference information and a category of the interference information.

With reference to the second aspect, in an embodiment of the second aspect, when a one-way propagation delay $T_r$ of a sensing signal is greater than a one-way propagation delay $T_c$ of a communication signal, the sensing resource allocated to the terminal device includes a first frame structure, a sensing window of an uplink frame in the first frame structure is used to transmit the sensing signal, a length L of the sensing window meets $2(T_r-T_c)\leq L\leq M$, and M is a length of the uplink frame.

With reference to the second aspect, in an embodiment of the second aspect, the terminal device sends a third message to the network device, where the third message includes information indicating whether the terminal device has a sensing receiver.

According to a third aspect, a sensing signal transmission apparatus is provided, configured to perform the method according to any one of the possible implementations of the first aspect. In an embodiment, the apparatus includes modules configured to perform the method according to any one of the possible implementations of the first aspect.

According to a fourth aspect, another sensing signal transmission apparatus is provided, configured to perform the method according to any one of the possible implementations of the second aspect. In an embodiment, the apparatus includes modules configured to perform the method according to any one of the possible implementations of the second aspect.

In an embodiment, the apparatus may include modules that are in a one-to-one correspondence with the methods/operations/operations/actions described in the foregoing aspects. The modules may be implemented by a hardware circuit, software, or a combination of a hardware circuit and software.

In an embodiment, the apparatus is a communication chip. The communication chip may include an input circuit or interface configured to send information or data, and an output circuit or interface configured to receive information or data.

In an embodiment, the apparatus is a communication device. The communication device may include a transmitter configured to send information or data, and a receiver configured to receive information or data.

In an embodiment, the apparatus is configured to perform the method according to the foregoing aspects or any one of the possible implementations of the foregoing aspects. The apparatus may be configured in the terminal device or the network device, or the apparatus itself is the terminal device or the network device.

According to a fifth aspect, another sensing signal transmission apparatus is provided. The apparatus includes a processor and a memory. The memory is configured to store a computer program, and the processor is configured to invoke the computer program from the memory and run the computer program, to enable the apparatus to perform the method according to any one of the possible implementations of any one of the foregoing aspects.

In an embodiment, there are one or more processors, and there are one or more memories.

In an embodiment, the memory may be integrated with the processor, or the memory and the processor are separately disposed.

In an embodiment, the communication device further includes a transmitter and a receiver. The transmitter and the receiver may be separately disposed, or may be integrated together to obtain a transceiver.

According to a sixth aspect, a communication system is provided. The communication system includes an apparatus configured to implement the method according to the first aspect or any one of the possible implementations of the first aspect, and an apparatus configured to implement the method according to the second aspect or any one of the possible implementations of the second aspect.

In an embodiment, the communication system may further include another device that interacts with the terminal device or the network device in the solutions provided in embodiments of this application.

According to a seventh aspect, a computer program product is provided. The computer program product includes a computer program (or may be referred to as code or instructions). When the computer program is run, a computer is enabled to perform the method according to any one of the possible implementations of any one of the foregoing aspects.

According to an eighth aspect, a computer-readable medium is provided. The computer-readable medium stores a computer program (or may be referred to as code or instructions). When the computer program is run on a computer, the computer is enabled to perform the method according to any one of the possible implementations of any one of the foregoing aspects.

According to a ninth aspect, a communication apparatus is provided. The communication apparatus includes a communication interface and a logic circuit. The communication interface is configured to send a first message and/or receive a second message, and the logic circuit is configured to obtain an allocated sensing resource based on the second message, to perform the method according to any one of the possible implementations of the first aspect.

According to a tenth aspect, another communication apparatus is provided. The communication apparatus includes a communication interface and a logic circuit. The logic circuit is configured to receive a first message and/or send a second message, and the logic circuit is configured to allocate a sensing resource based on the first message, to perform the method according to any one of the possible implementations of the second aspect.

BRIEF DESCRIPTION OF DRAWINGS

FIG. 1 is a schematic diagram of a sensing application scenario according to an embodiment of this application;

DESCRIPTION OF EMBODIMENTS

Figure 2:
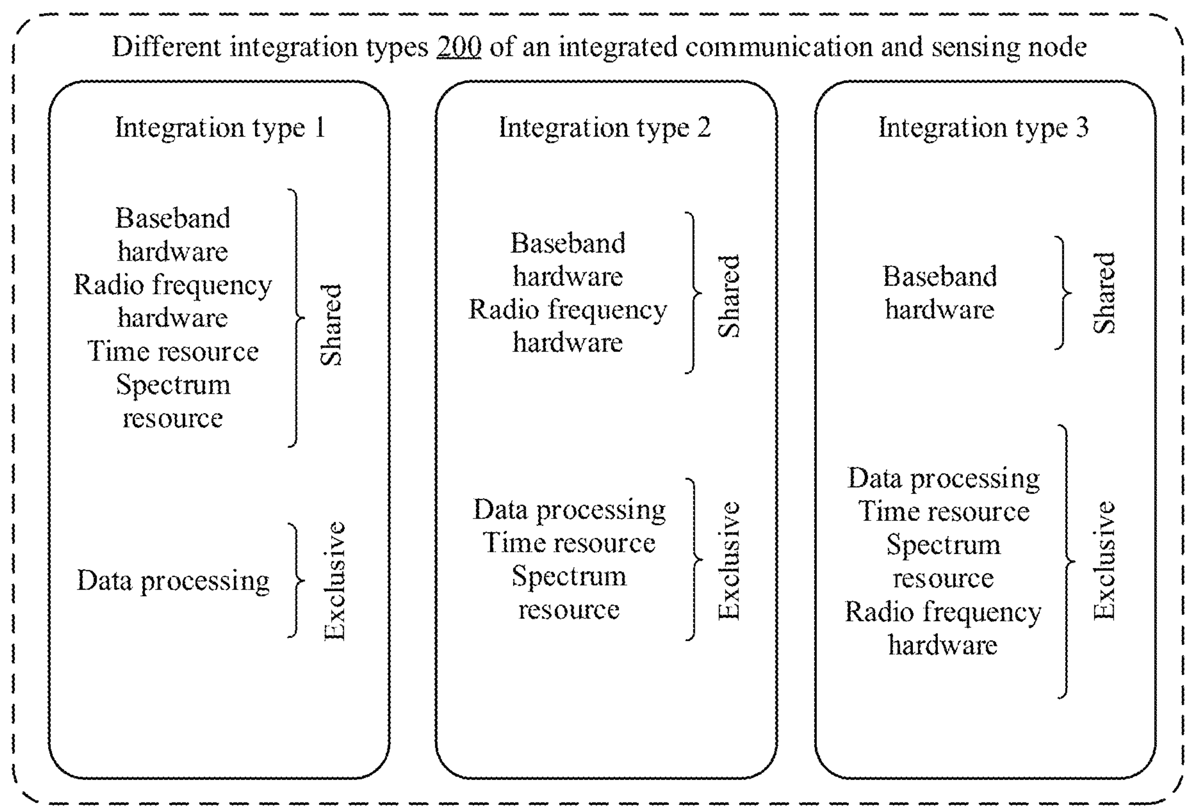
FIG. 2 is a schematic diagram of different integration types of an integrated communication and sensing node according to an embodiment of this application.

The following describes technical solutions of this application with reference to accompanying drawings.

The following describes technical solutions of this application with reference to accompanying drawings.

Figure 1:
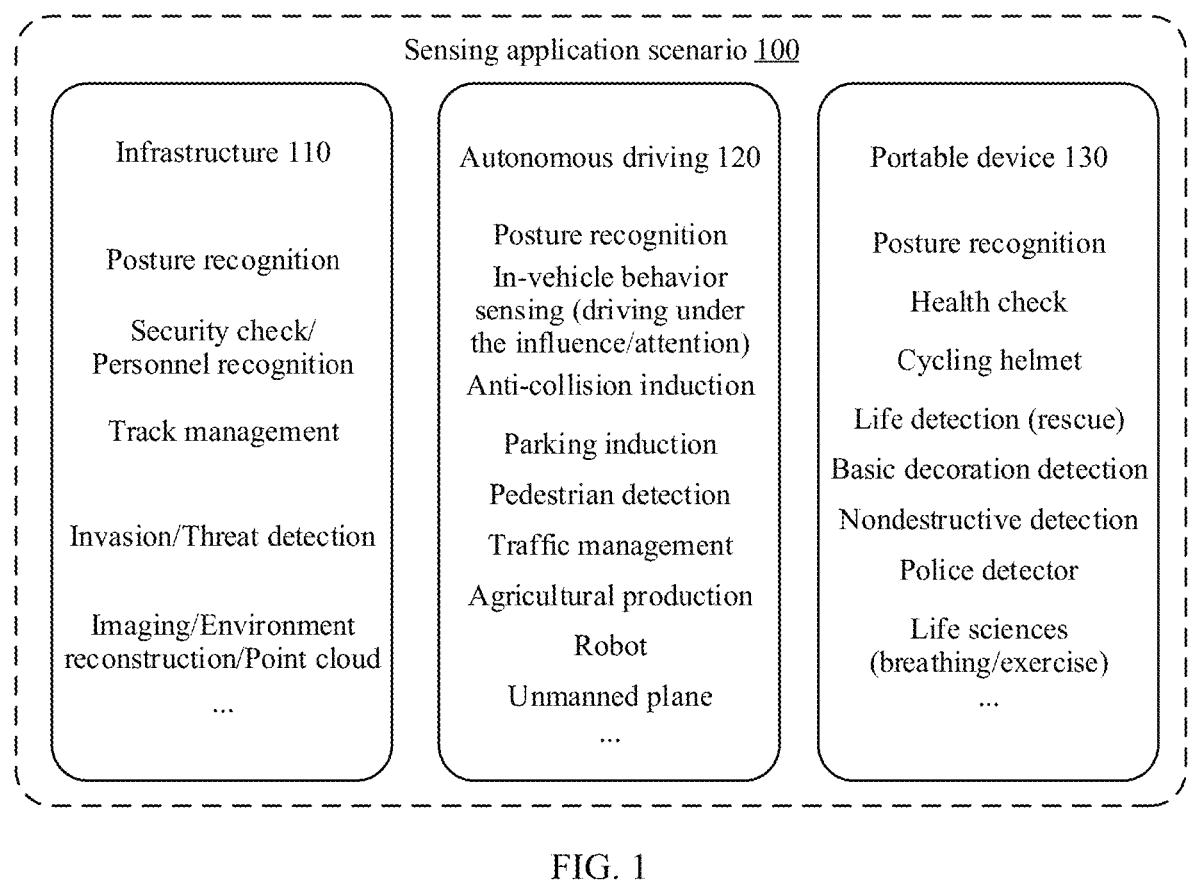

For example, FIG. 1 is a schematic diagram of a sensing application scenario 100 according to an embodiment of this application. As shown in FIG. 1, sensing has three typical application scenarios, which are respectively infrastructure 110, autonomous driving 120, and portable device 130. Different application scenarios have different sensing service types, and different sensing service types correspond to different service requirements.

For the infrastructure 110 scenario, a sensing function may be used to perform tasks such as security check and track management at an airport, perform tasks such as personnel counting and personnel positioning at a factory, and perform tasks such as imaging and environment reconstruction in a building.

For the autonomous driving 120 scenario, an autonomous driving device with the sensing function may be used to perform tasks such as posture recognition, in-vehicle behavior sensing, anti-collision sensing, traffic management, and pedestrian detection.

For the portable device 130 scenario, an electronic device with the sensing function may be used to perform health check, a cycling helmet with the sensing function may be used to perform safety prediction, a detector with the sensing function may be used to perform life detection, and a police scanner with the sensing function may be used to perform tasks such as evidence collection.

A broad definition of the sensing is to use an electromagnetic wave to understand and detect an object and a signal in space, and may include meanings such as positioning, radar, imaging, action recognition, object recognition, and environment reconstruction.

Currently, because spectrum resources are very limited, a same frequency may be multiplexed for sensing and communication. Therefore, mutual coordination between a communication resource and a sensing resource is required. In a non-cooperation mode, sensing nodes do not communicate with each other, and cannot learn of resource usage of each other. However, in a cooperation mode, the sensing nodes may communicate with each other and coordinate with each other, to avoid frequency resource multiplexing, so as to reduce interference.

In a future network, mutual integration (referred to as an integrated communication and sensing node below) of a communication node and the sensing node may occur, and integrated communication and sensing nodes of different integration types may exist. The integrated communication and sensing node refers to an integration design of the communication node and the sensing node, and an efficient design of the communication and the sensing may be implemented simultaneously by sharing some resources, for example, a hardware resource, a computing resource, a space resource, a time resource, and a frequency resource. In this way, overheads incurred by, for example, a power loss, a site location, and costs are reduced.

For example, FIG. 2 is a schematic diagram of different integration types 200 of an integrated communication and sensing node according to an embodiment of this application. As shown in FIG. 2, there may be three different integration types.

In a first integration type, the integrated communication and sensing node may share a hardware resource, a radio frequency resource, a baseband resource, a time resource, a spectrum resource, and the like, but a communication signal and a sensing signal are processed separately. A joint waveform is used as an example, and advantages of this integration mode are that the communication signal and the sensing signal can be transmitted simultaneously, and an anti-interference capability is strong.

In a second integration type, the integrated communication and sensing node may share a radio frequency resource and a baseband resource. In this case, in addition to the separate processing of the communication signal and the sensing signal, the communication signal and the sensing signal may be separately transmitted in a time division multiplexing manner or a frequency division multiplexing manner. A time division multiplexing waveform is used as an example, and advantages of this integration manner are that the communication signal and the sensing signal have strong independence, and interference between the communication node and the sensing node is small.

In a third integration type, the integrated communication and sensing node may share a baseband resource, and the communication signal and the sensing signal are transmitted by using respective resources in space domain, time domain, and frequency domain.

It should be understood that there may be other different integration types. This is not limited in an embodiment of the application.

Figure 3:
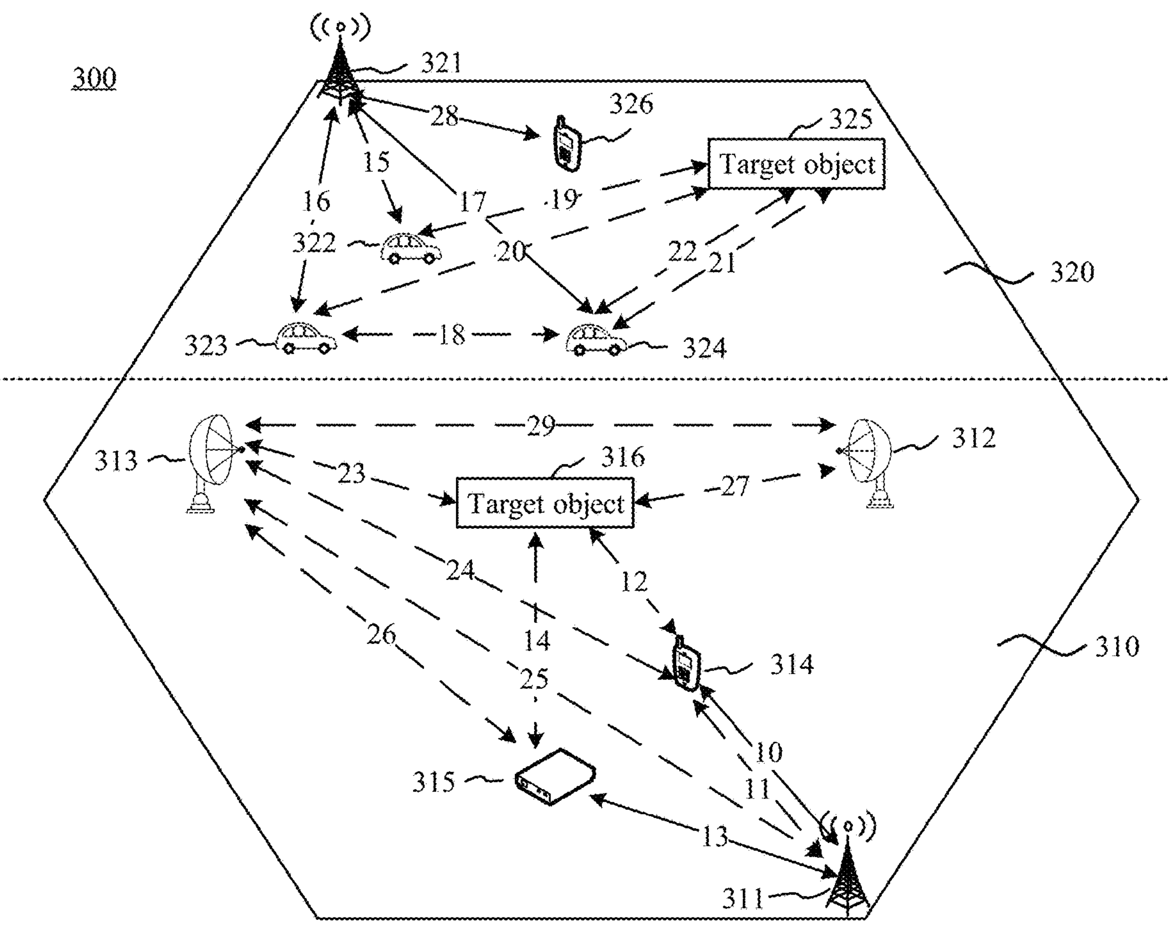
FIG. 3 is a schematic diagram of a scenario in which various types of integrated communication and sensing nodes coexist according to an embodiment of this application.

In the foregoing integrated sensing and communication network, integrated communication and sensing nodes of various integration types may coexist. For example, FIG. 3 is a schematic diagram of a scenario in which various types of integrated communication and sensing nodes coexist according to an embodiment of this application. As shown in FIG. 3, an integrated sensing and communication network 300 includes a cooperation mode 310 and a non-cooperation mode 320. The cooperation mode 310 includes a base station 311, a radar 312, a radar 313, a terminal device 314, and customer premise equipment (for example, an optical modem) (CPE) 315 and a target object 316. The non-cooperation mode 320 includes a base station 321, a vehicle 322, a vehicle 323, a vehicle 324, a target object 325, and a terminal device 326. Solid black lines represent communication signals, and dashed black lines represent sensing signals from different sensing nodes. The base station 311 and the base station 321 are resource control and management centers, and may perform resource management for various types of integrated communication and sensing nodes.

The cooperation mode 310 includes a plurality of different types of integrated communication and sensing nodes. For example, the terminal device 314 is the integrated communication and sensing node of the first integration type, has both a communication function and a sensing function, and can transmit a communication signal (as shown by a solid black line 10) and a sensing signal (as shown by a dashed black line 11) to the base station 311 simultaneously or at a same frequency or transmit a sensing signal (as shown by a dashed black line 12) used to sense the target object 317. For another example, the CPE 315 is the integrated communication and sensing node of the second integration type, and may transmit a communication signal (as shown by a solid black line 13) on one time domain resource in a space division multiplexing manner, and transmit a sensing signal (as shown by a dashed black line 14) on another time domain resource. The communication signal and the sensing signal are distinguished in a time division multiplexing manner, and are separately transmitted.

In the integrated sensing and communication network 300, the radar 312 is a protected sensing node, and a sensing signal (as shown by a dashed black line 27) transmitted by the radar 312 may be interfered by another sensing node, such as the radar 313. The radar 313 is a sensing node with offensive interference, that is, the radar 313 is an unregistered device in the base station 311. Therefore, the signal sent by the radar 313 is offensive interference (as shown by dashed black lines 23, 24, 25, 26, and 29) for all terminal devices in the integrated sensing and communication network 300.

In the non-cooperation mode 320, the vehicle 322, the vehicle 323, and the vehicle 324 are the integrated communication and sensing node of the third integration type described above, and the communication signal and the sensing signal are transmitted separately without interfering with each other. However, the communication signal and the sensing signal cannot learn of resource usage of each other in time domain, space domain, frequency domain, or the like. For example, when the communication signal and the sensing signal multiplex a same frequency, interference may be generated. The vehicle 322, the vehicle 323, and the vehicle 324 may communicate with the base station 321 to transmit communication signals (as shown by solid black lines 14, 16, and 17). However, the vehicle 322, the vehicle 323, and the vehicle 324 cannot communicate with each other, can only transmit a sensing signal (as shown by a dashed black line 18), and the vehicle 322, the vehicle 323, and the vehicle 324 may also transmit sensing signals (as shown by dashed black lines 19, 20, and 21) for sensing the target object 324. In addition, the vehicle 324 may also receive a sensing signal (as shown by a dashed black line 22) of the vehicle 323, so that smooth receiving of the sensing signal of the vehicle 323 can be ensured.

For example, no sensing node exists in the terminal device 326, or the sensing function is not enabled. Therefore, the terminal device 326 has only the communication function, and may transmit a communication signal (as shown by a solid black line 28) to the base station 311.

Resources (referred to as communication and sensing resources below) shared by the different integrated communication and sensing nodes correspond to different sensing performance, and the sensing performance includes one or more of key performance indexes (KPI) such as a sensing angle, a sensing range, and sensing accuracy. The sensing performance reflects different service requirements corresponding to different sensing service types.

Figure 4:
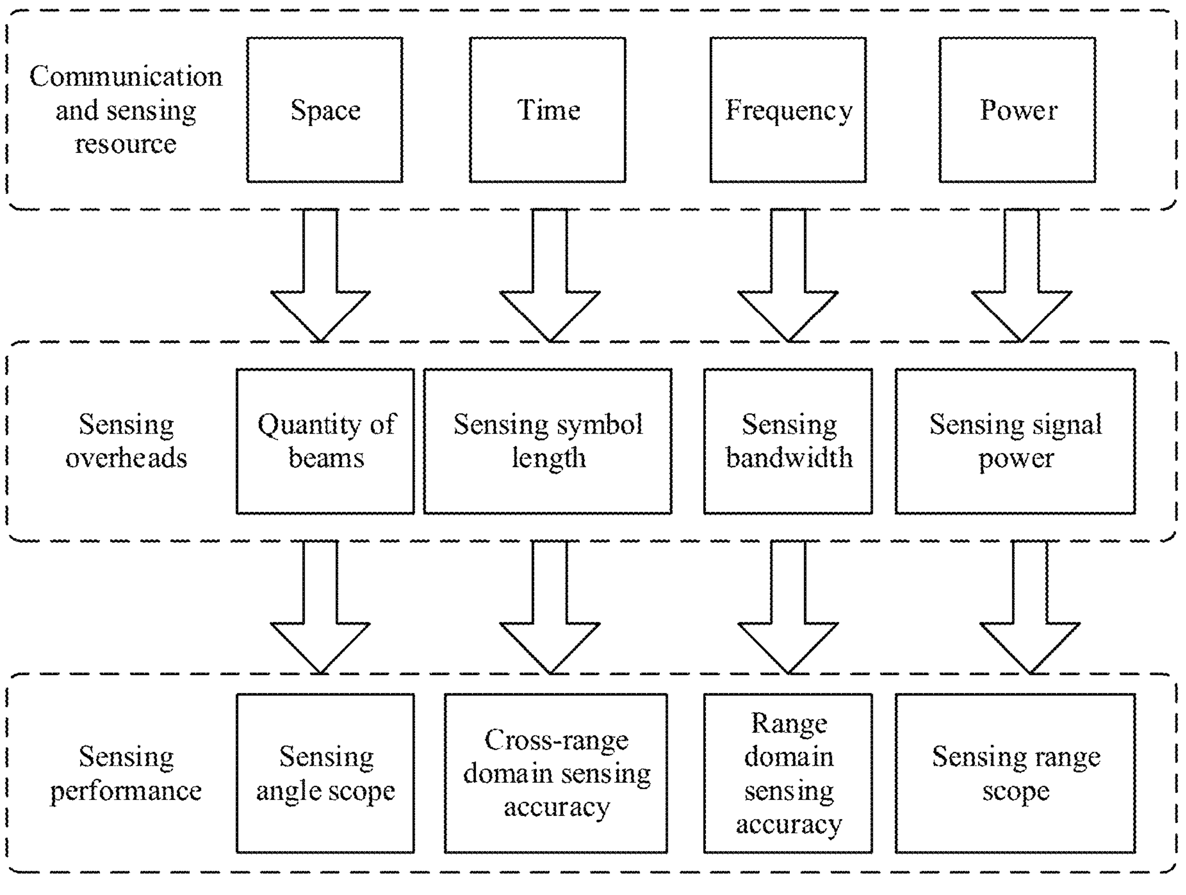
FIG. 4 is a schematic diagram of sensing performance corresponding to different communication and sensing resources according to an embodiment of this application.

For example, FIG. 4 is a schematic diagram of sensing performance corresponding to different communication and sensing resources according to an embodiment of this application. As shown in FIG. 4, the communication and sensing resource may include one or more of resources in different dimensions, such as space, time, a frequency, and power. When a sensing signal is transmitted, different sensing overheads are incurred on the sensing resources in different dimensions. The sensing overheads may include one or more of a quantity of beams, a quantity of antennas, a sensing symbol length, a period length, bandwidth, transmit power, and a power loss.

For the communication and sensing resource in the space dimension, the sensing overheads of the communication and sensing resource may include the quantity of beams allocated to an integrated communication and sensing node, and the sensing performance may be described by using a sensing angle scope. Different sensing service types require different sensing angle scopes. For example, for an anti-collision induction and sensing service type, a small sensing angle is required, but for a life rescue sensing service type, a large sensing angle is required.

For the communication and sensing resource in the time dimension, the sensing overheads of the communication and sensing resource may include the sensing symbol length allocated to the integrated communication and sensing node, and the sensing performance may be described by using cross-range domain sensing accuracy. Different sensing service types require different cross-range domain sensing accuracy. For example, a gesture recognition service type based on a portable device requires medium cross-range domain sensing accuracy, and a bending posture of each finger may be directly collected, and azimuthal time and space parameters between two fingers are processed through data normalization and smoothing.

For the communication and sensing resource in the frequency dimension, the sensing overheads of the communication and sensing resource may include the sensing bandwidth allocated to the integrated communication and sensing node, and the sensing performance may be described by using range domain sensing accuracy. Different sensing service types require different range domain sensing accuracy. For example, for an anti-collision induction and sensing service type, high range domain sensing accuracy is required, but for a gesture recognition sensing service type, medium range domain sensing accuracy is required.

For the communication and sensing resource in the power dimension, the sensing overheads of the communication and sensing resource may include the sensing signal power allocated to the integrated communication and sensing node, and the sensing performance may be described by using a sensing range scope. Different sensing service types require different sensing range scopes. For example, for a security check and intrusion detection sensing service type, a medium sensing range scope is required, but for an industrial and agricultural production sensing service type, a long sensing range scope is required.

Different sensing service types also have different sensing performance requirements based on different priorities, and have different scheduling requirements for a resource management period or the like. For example, a required resource can be allocated to a high-priority service in real time, and the resource allocation does not need to be performed when the resource management period arrives.

For example, Table 1 is a schematic diagram of sensing performance corresponding to sensing service types of different priorities according to an embodiment of this application. As shown in Table 1, the anti-collision induction and sensing service type requires a large sensing scope, has high requirements on accuracy and reliability, and belongs to a high-priority service. A communication and sensing resource with a small sensing angle, a long sensing range, and high sensing accuracy may be allocated to the anti-collision induction and sensing service type. The life rescue sensing service type also requires a large sensing scope, has a high requirement on the reliability, and also belongs to the high-priority service. A communication and sensing resource with a large sensing angle, a long sensing range, and a medium sensing accuracy may be allocated to the life rescue sensing service type.

The security check and intrusion detection sensing service type have a high requirement on the reliability, but have moderate requirements on other sensing performance, thus belonging to a medium-priority service. A communication and sensing resource with a large sensing angle, a medium sensing range, and medium sensing accuracy may be allocated to the security check and intrusion detection sensing service type. The industrial and agricultural production sensing service type also has a high requirement on the reliability, thus belonging to the medium-priority service. A communication and sensing resource with a large sensing angle, a long sensing range, and medium sensing accuracy may be allocated to the industrial and agricultural production sensing service type.

Gesture recognition and health management and respiratory monitoring sensing service types have a moderate requirement on the reliability and belong to a low-priority service. A communication and sensing resource with a small sensing angle, a small sensing range, and medium sensing accuracy may be allocated to the gesture recognition, health management, and respiratory monitoring sensing service types.

TABLE 1

| Service type | Priority | Sensing angle | Sensing range | Sensing accuracy | Sensing reliability |
|---|---|---|---|---|---|
| Anti-collision induction | High | Small | Short | High | High |
| Life rescue | High | Large | long | Medium | High |
| Security check and intrusion detection | Medium | Large | Medium | Medium | High |
| Industrial and agricultural production | Medium | Large | long | Medium | High |
| Gesture recognition | Low | Small | Short | Medium | Medium |
| Health management | Low | Small | Short | Medium | Medium |

These different types of integrated communication and sensing nodes require different communication and sensing resources. To avoid mutual interference between the communication and sensing resources in a complex network, a base station needs to perform resource management locally or at an upper layer, and manage the communication and sensing resources in a communication manner.

With automotive radars, the internet of vehicles, pan terminals (for example, user equipment with integrated communication and sensing, vehicles, and the internet of things (IoT)), sensing base stations, and the like are more and more widely used, more sensing radio frequency spectra are generated, and mutual interference may be generated between these sensing radio frequency spectra. The automotive radars are used as an example, and typical interference may come from mutual interference between the radars. Alternatively, a jammer made of cheap hardware transmits a high-power frequency-modulated continuous wave (FMCW) to the radars, and when the FMCW radars work in a same frequency band, interference is generated in a dense radio frequency signal environment.

Interference faced by a sensing node includes cluttering jamming and/or spoofing jamming. The cluttering jamming may cause the sensing to fail to detect a target signal, thereby reducing a target detection probability. The spoofing jamming causes the sensing to tack a false target, and loses an ability to track a real target, which has serious impact on target recognition.

Figure 5:
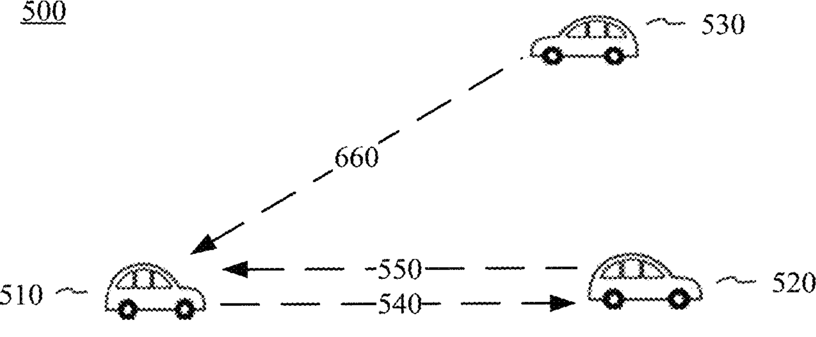
FIG. 5 is a schematic diagram of a sensing interference scenario according to an embodiment of this application.

For example, FIG. 5 is a schematic diagram of a sensing interference application scenario 500 according to an embodiment of this application. As shown in FIG. 5, the scenario 500 includes a vehicle 510, a vehicle 520, and a vehicle 530. The vehicle 510 sends a sensing signal 540 to sense information such as a shape, a speed, or a position of the vehicle 520. After the sensing signal 540 reaches the vehicle 520, the sensing signal 540 is reflected back. In this case, the vehicle 510 may receive a reflected sensing signal 550. The sensing signal 540 and the sensing signal 550 are actually a same signal, and a difference lies in that power of the two sensing signals may be different. In addition, the vehicle 530 may send a sensing signal 560 to sense another vehicle. However, because the sensing signal 560 and the sensing signal 550 may be signals of a same type, the vehicle 510 cannot distinguish the sensing signal 550 from the sensing signal 560. In this case, the sensing signal 560 is an interference signal of the sensing signal 550.

In an embodiment, a sensing interference suppression technology relies on an avoidance method, and a narrow beam and an electronically scanned beam may be used to reduce a possibility of overlap in a space dimension, to reduce the interference. For example, a typical field of view configured for a long-range automotive cruise control (ACC) radar is ±8°, but strong interference is still received from an antenna side lobe. A slope of a linear frequency-modulated continuous wave can be randomly changed to avoid interference caused by overlap in a time dimension, and a start frequency and cut-off frequency of the linear frequency-modulated continuous wave are randomly changed to reduce interference caused by overlap in a frequency dimension.

In an embodiment, accidental synchronization of sensing resources can be avoided to some extent. However, in an environment with dense sensing nodes, more and more sensing signals need to be transmitted, and the avoidance manner is limited, thereby reducing a target detection probability.

In view of this, embodiments of this application provide a sensing signal transmission method and apparatus. In an integrated sensing and communication network, a terminal device requests a network device to allocate a sensing resource. After receiving the request message from the terminal device, the network device allocates the sensing resource to the terminal device, and the terminal device transmits a sensing signal on the allocated sensing resource. In this method, the network device is used as a resource management center, and transmission of the sensing signal is coordinated in a communication manner, so that overlap of sensing resources can be effectively avoided. This eliminates mutual interference between sensing signals.

The terminal device in embodiments of this application may also be referred to as user equipment, an access terminal, a subscriber unit, a subscriber station, a mobile station, a mobile console, a remote station, a remote terminal, a mobile device, a user terminal, a terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN), or the like. This is not limited in embodiments of this application.

As an example instead of a limitation, in embodiments of this application, the terminal device may alternatively be a wearable device. The wearable device may also be referred to as a wearable intelligent device, and is a general term of a wearable device that is intelligently designed and developed for daily wear by using a wearable technology, for example, glasses, gloves, a watch, clothing, and shoes. The wearable device is a portable device that can be directly worn on the body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application function and need to work with other devices such as smartphones, such as various smart bands or smart jewelry for monitoring physical signs.

In addition, the terminal device in embodiments of this application may alternatively be a terminal device in an IoT system. IoT is an important part of future development of information technologies. A main technical feature of the IoT is connecting a thing to a network by using a communication technology, to implement an intelligent network for interconnection between a person and a machine or between things. In embodiments of this application, an IoT technology may implement massive connections, deep coverage, and terminal power saving by using, for example, a narrowband NB technology.

In addition, in embodiments of this application, the terminal device may alternatively be a terminal device using a device-to-device (D2D) communication technology. The D2D technology refers to a communication manner in which two peer terminal devices directly communicate with each other. In a distributed network formed by D2D terminal devices, each terminal device node can send and receive signals, and has an automatic routing (message forwarding) function.

In addition, in embodiments of this application, the terminal device may further include a sensor such as an intelligent printer, a train detector, or a gas station. Main functions of the terminal device include collecting data (for some terminal devices), receiving control information and downlink data from a network device, sending an electromagnetic wave, and transmitting uplink data to the network device.

The network device in embodiments of this application may be a device configured to communicate with the terminal device. The network device may be a base transceiver station (BTS) in a global system for mobile communications GSM) system or a code division multiple access (CDMA) system, may be a NodeB (NB) in a wideband code division multiple access (WCDMA) system, may be an IoT base station in an IoT system or an NB-IoT base station in a narrowband internet of things (NB-IoT) system, may be an evolved NodeB (evolved NodeB, eNB or eNodeB) in an LTE system, or may be a radio controller in a cloud radio access network (CRAN) scenario. Alternatively, the network device may be a relay station, an access point, a vehicle-mounted device, a wearable device, a network device in a 5G network, a network device in a future evolved PLMN network, or the like. This is not limited in embodiments of this application.

The network device in embodiments of this application may be a device in a wireless network, for example, a radio access network (RAN) node that connects a terminal to the wireless network. Currently, the RAN node is, for example, a base station, a next generation NodeB gNB, a transmission reception point (TRP), an evolved NodeB (evolved NodeB, eNB), a home NodeB, a baseband unit (BBU), or an access point (access point, AP) in a Wi-Fi system. In a network structure, the network device may include a centralized unit (CU) node, a distributed unit (DU) node, or a RAN device including the CU node and the DU node.

It should be understood that both the terminal device and the network device may be integrated communication and sensing nodes, that is, have both a communication function and a sensing function.

Before the sensing signal transmission method provided in embodiments of this application is described, the following descriptions are first provided.

First, in the embodiments shown below, terms and English acronyms such as first message, first frame structure, and sensing signal are all examples provided for ease of description, and shall not constitute any limitation on this application. This application does not exclude a possibility of defining another term that can implement a same or similar function in an existing or future protocol.

Second, terms "first", "second", and various numbers in the following embodiments are merely used for distinguishing for ease of description, for example, distinguishing between different messages, and are not intended to limit the scope of embodiments of this application.

Third, "at least one" means one or more, and "a plurality of" means two or more. A term "and/or" describes an association relationship between associated objects, and indicates that three relationships may exist. For example, A and/or B may indicate the following three cases: A exists alone, both A and B exist, and B exists alone, where A and B may be singular or plural. A character "/" usually indicates an "or" relationship between associated objects. "At least one of the following items (pieces)" or a similar expression thereof indicates any combination of these items, including a single item (piece) or any combination of a plurality of items (pieces). For example, at least one of a, b, and c may indicate: a, or b, or c, a and b, a and c, b and c, or a, b, and c, where a, b, and c may be singular or plural.

Figure 6:
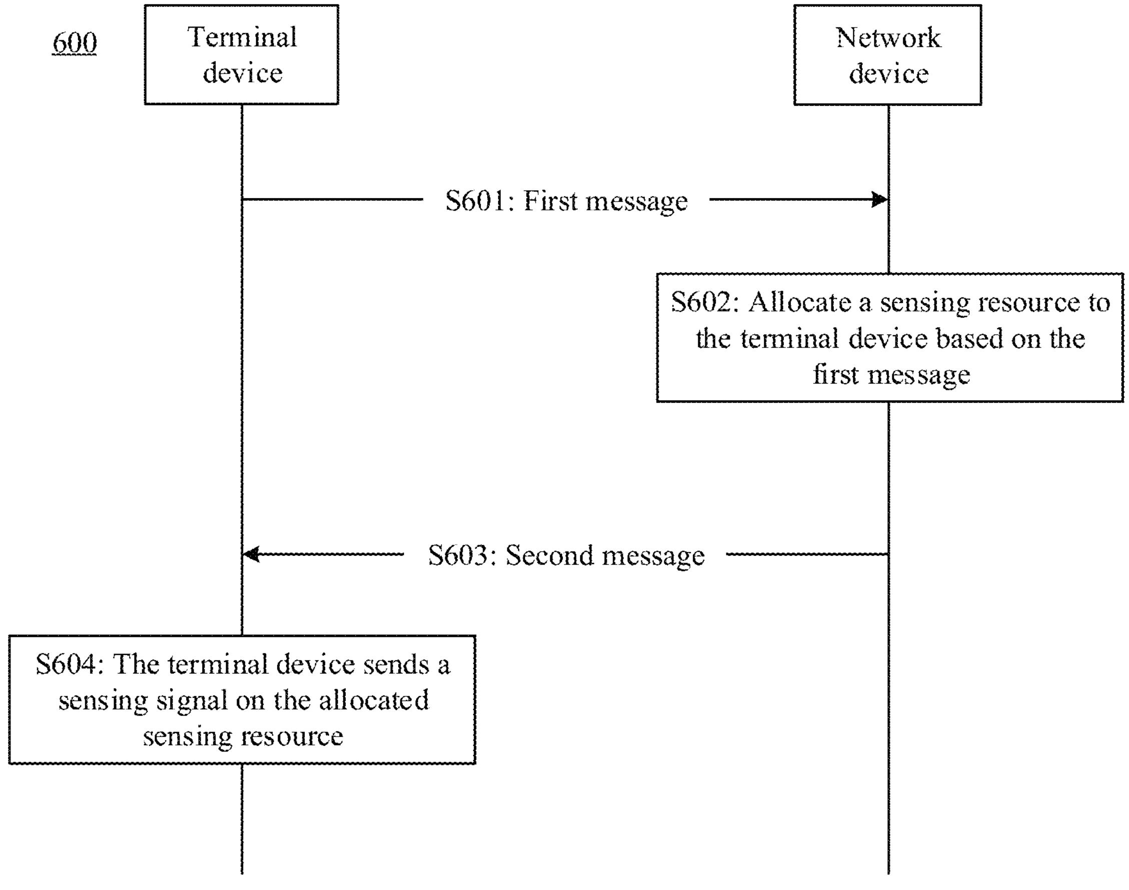
FIG. 6 is a schematic flowchart of a sensing signal transmission method according to an embodiment of this application.

The following describes in detail the method provided in this application with reference to FIG. 6.

For example, FIG. 6 is a schematic flowchart of a sensing signal transmission method 600 according to an embodiment of this application. The method may be applied to the scenario in which various integration types of integrated communication and sensing nodes coexist and shown in FIG. 3. However, an embodiment of the application is not limited thereto. As shown in FIG. 6, the method 600 includes the following operations.

S601: A terminal device sends a first message to a network device, where the first message includes information for requesting the network device to allocate a sensing resource to the terminal device. Correspondingly, the network device receives the first message from the terminal device.

In an embodiment of the application, the first message is used to request the network device to allocate the sensing resource to the terminal device. The sensing resource may be one or more of a hardware resource, a computing resource, a time resource, a space resource, or a frequency resource. The first message may carry any known message for communication between the terminal device and the network device, or the first message may be a newly set message for the communication between the terminal device and the network device. A form of the first message is not limited in an embodiment of the application.

In an embodiment, the terminal device may periodically send the first message to the network device, or may aperiodically send the first message to the network device.

In an embodiment, the first message may further include a sensing service type of the terminal device. The sensing service type may include one or more of gesture recognition, anti-collision induction, security check and invader detection, life rescue, industrial and agricultural production, and health management and respiratory detection.

In an embodiment, the first message may further include channel information that has been obtained by a communication node and/or a sensing node in the terminal device, and the channel information may include one or more of channel information such as additive white Gaussian noise (AWGN), small-scale fading, or large-scale fading.

In an embodiment, the first message may further include information indicating whether the sensing resource of the terminal device needs to be managed. In this way, the terminal device on which resource management needs to be performed can be specified for the network device, to avoid additional computing overheads of the network device.

In an embodiment, the first message may further include the integration type of the integrated communication and sensing node. The integration type may include the three integration types shown in the different integration types 200 in FIG. 2 in embodiments of this application. Details are not described herein again.

S602: The network device allocates the sensing resource to the terminal device based on the first message.

In an embodiment of the application, after receiving the first message, the network device may analyze and determine information included in the first message. For example, when a current frequency has been used to transmit a communication signal, and the terminal device requests to transmit a sensing signal by using the frequency, the network device may perform mutual coordination on a communication and sensing resource and allocate another frequency to the terminal device, to avoid frequency multiplexing of the communication and the sensing, so as to perform interference suppression.

In an embodiment, the network device may allocate the sensing resource to the terminal device based on a fixed resource management period, or may allocate the sensing resource to the terminal device in real time.

In an embodiment of the application, if the network device allocates the sensing resource to the terminal device based on the fixed resource management period, computing overheads of the network device can be reduced, and a power loss can be reduced. If the network device allocates the sensing resource to the terminal device in real time, a service requirement of a sensing service type that requires high real-time performance can be met in time.

In an embodiment, when the first message includes the sensing service type, the network device may learn of, based on the sensing service type, priority information corresponding to the sensing service type. For a high-priority sensing service type, for example, an autonomous driving service, the network device may allocate a corresponding sensing resource to an autonomous driving vehicle in real time instead of waiting for the resource management period of the network device to allocate the sensing resource such as a frequency, a range, and power to the autonomous driving vehicle.

In an embodiment, when the first message includes the sensing service type, different sensing service types have different service requirements, and the different service requirements correspond to different sensing performance KPIs. The sensing performance KPI may include a sensing angle, sensing accuracy, a sensing range, sensing reliability, and the like. The network device may allocate a corresponding sensing performance KPI to the terminal device based on the different service requirements.

For example, for an anti-collision induction service in a high-speed autonomous driving scenario, an autonomous driving vehicle may need to perform long-range sensing. Therefore, after determining that the sensing service type of the autonomous driving vehicle is the high-speed anti-collision induction service, the network device allocates a long sensing range to the autonomous driving vehicle. For an anti-collision sensing service in a low-speed autonomous driving scenario, an autonomous driving vehicle may need to perform short-range sensing. Therefore, after determining that the sensing service type of the autonomous driving vehicle is the low-speed anti-collision induction service, the network device allocates a short sensing range to the autonomous driving vehicle.

In an embodiment, when the first message includes the information that the sensing resource of the terminal device needs to be managed, the network device allocates a corresponding sensing resource to the terminal device based on other obtained information, such as the sensing service type, the integration type, and the priority information.

In an embodiment, when the first message includes the information that the sensing resource of the terminal device does not need to be managed, the network device may not consider sensing resource usage of the terminal device. In this way, overheads of the network device can be reduced.

In an embodiment, when the first message includes the integration type of the integrated communication and sensing node, the network device allocates a corresponding sensing resource to the terminal device based on the integration type.

For example, for the first integration type shown in the different integration types 200, the communication node and the sensing node multiplex time-frequency-space resources, and when receiving and sending of the sensing node are located in a same geographical location, the network device needs to manage a corresponding frame structure based on the first message.

S603: The network device sends a second message to the terminal device, where the second message includes the sensing resource allocated to the terminal device. Correspondingly, the terminal device receives the second message from the network device.

In an embodiment, the second message may include a time domain resource allocation result, for example, a transmission slot and/or a transmission period that are/is allocated to the terminal device and that are/is used to transmit the sensing signal.

In an embodiment, the second message may include a space domain resource allocation result, for example, a quantity of beams and/or a transmission angle that are/is allocated to the terminal device and that are used to transmit the sensing signal.

In an embodiment, the second message may include a frequency domain resource allocation result, for example, a transmission frequency band and/or transmission subcarrier that are/is allocated to the terminal device and that are/is used to transmit the sensing signal.

In an embodiment, the second message may include a power domain resource allocation result, for example, transmit power and/or a power loss that are/is allocated to the terminal device and that are/is used to transmit the sensing signal.

In an embodiment, the second message may further include a resource allocation result in a hardware dimension, for example, baseband hardware and/or radio frequency hardware.

S604: The terminal device sends the sensing signal on the allocated sensing resource.

It should be understood that, in an embodiment of the application, a communication signaling interaction process in which the terminal device sends the first message to the network device and the network device sends the second message to the terminal device is used, to coordinate the sensing resource in a communication manner and manage the sensing resource by using the network device. Transmitting the sensing signal on the allocated sensing resource can effectively avoid mutual interference between the various integration types of integrated communication and sensing nodes.

In an embodiment, after receiving the second message, the terminal device obtains, through parsing, allocated sensing resources represented by different bytes in the second message, and the terminal device transmits the sensing signal based on the allocated sensing resource.

It should be understood that, in the method 600, the integrated communication and sensing node is the terminal device, that is, the terminal device has both a communication function and a sensing function.

According to the sensing signal transmission method in an embodiment of the application, the network device is used as a resource management center, and the allocation of the sensing resource is coordinated in the communication manner. The terminal device can perform interference-free transmission on the allocated sensing resource, so that signal interference in a network with dense integrated communication and sensing nodes can be effectively avoided. This further improves a probability to detect a target.

The foregoing uses only the method 600 as an example to describe the signaling interaction process in which the network device is enabled to manage the sensing resource in the communication manner. The following describes in detail a resource management process in the signaling interaction process with reference to FIG. 7 and FIG. 8.

Figure 7:
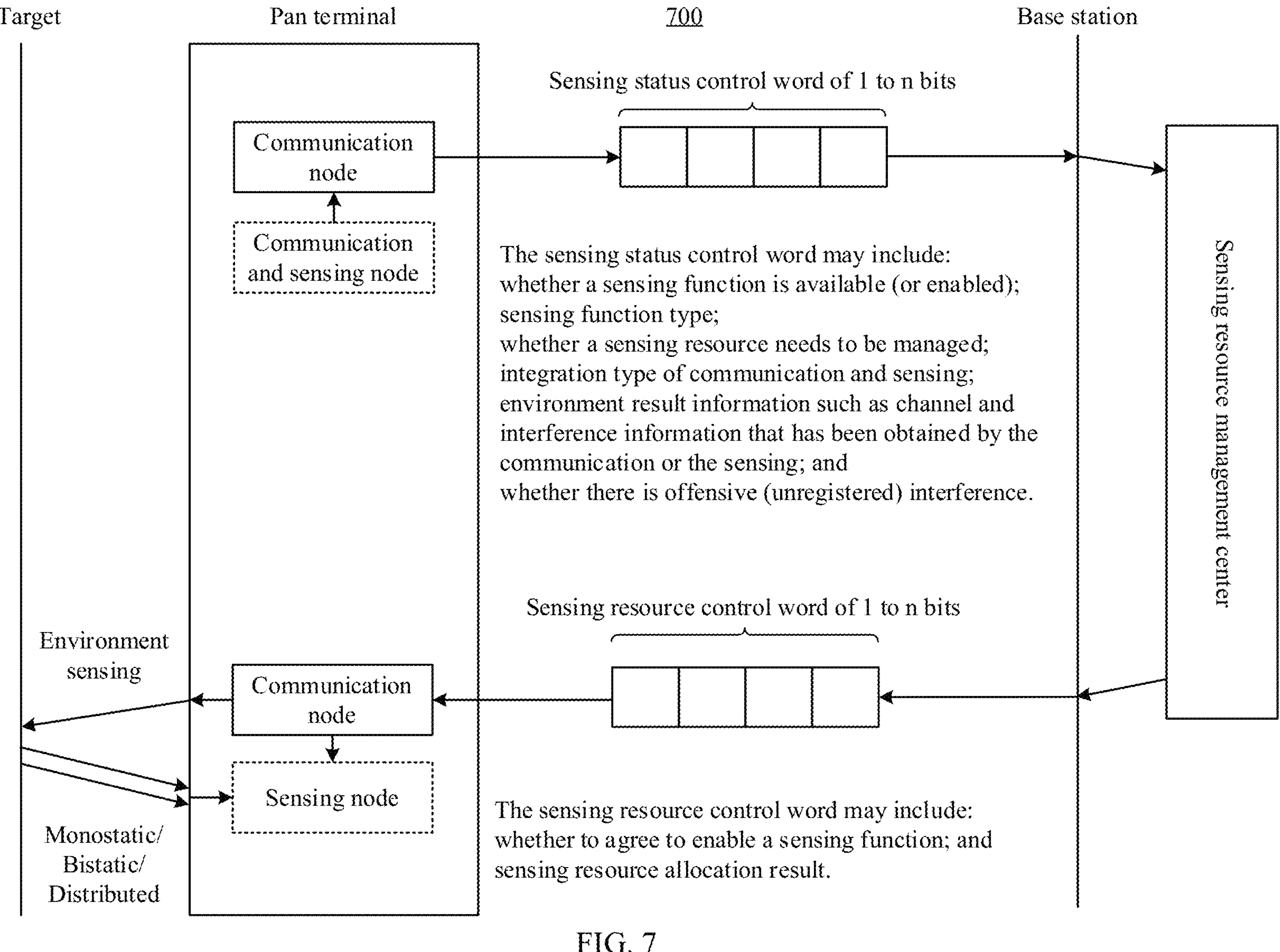
FIG. 7 is a schematic interaction diagram of a sensing signal transmission method according to an embodiment of this application.

For example, FIG. 7 is a schematic interaction diagram of a sensing signal transmission method according to an embodiment of this application. As shown in FIG. 7, a pan terminal starts or periodically sends a sensing status control word by using a communication resource. The sensing status control word may include one or more types of the following information: Whether the pan terminal has or enables a sensing function; a sensing function type, for example, one or more of a frequency band, a range, a transmit power, or a period; whether a sensing resource needs to be managed; an integration type of communication and sensing; environment sensing result information such as channel information and/or interference information that has been obtained by the communication or the sensing; and whether the interference information includes offensive interference information.

It should be understood that the sensing status control word may be sent by using the first message in the method 600. In addition, a length n of the sensing status control word may be any value. This is not limited in an embodiment of the application.

After receiving the sensing status control word of the pan terminal, a sensing resource management center may calculate collected information, for example, calculate transmit power suitable for a pan terminal to transmit a sensing signal, or calculate whether the pan terminal is suitable for transmitting the sensing signal on a frequency band. The sensing resource management center may be one or more of a base station, a road side unit (RSU), CPE, or an edge computing node.

After completing the computation, the sensing resource management center may send a sensing resource control word to the pan terminal through the communication resource, and the sensing resource control word includes information about a sensing resource allocated to the pan terminal.

After receiving the sensing resource control word, the pan terminal parses the information that is about the sensing resource allocated to the pan terminal and that is included in the sensing resource control word, to obtain the allocated sensing resource, and then the pan terminal performs environment sensing by using the allocated sensing resource.

In a process of performing the environment sensing, the pan terminal may receive the sensing signal in a monostatic, bistatic, or distributed networking mode. The monostatic networking mode means that receiving and sending of the sensing node are located in a same geographical location. For example, a pan terminal A is used to send a sensing signal to sense a target, and the sensing signal reflected back after the target sensing is received still by using the pan terminal A.

The bistatic networking mode means that the receiving and sending of the sensing node are not located in the same geographical location. For example, a pan terminal A is used to send a sensing signal to sense a target, but a pan terminal B is used to receive the sensing signal of the pan terminal A reflected back after the target sensing.

The distributed networking mode is extension of the bistatic networking mode. For example, a pan terminal A and a pan terminal B are used to send sensing signals to sense a target, but the pan terminal B is used to receive the sensing signal of the pan terminal A reflected back after the target sensing, and a pan terminal C is used to receive the sensing signal of the pan terminal B reflected back after the target sensing. By analogy, finally, a plurality of pan terminals process the received sensing signals in a centralized manner by using a data transmission system. In this way, the target can be sensed more accurately, and a probability to detect the target is improved.

In an embodiment, after completing the environment sensing based on the allocated sensing resource, the sensing node in the pan terminal may update the sensing status control word.

FIG. 7 describes a process of coordinating the sensing resource by using the communication resource, and the pan terminal may perform the environment sensing based on the allocated sensing resource. However, when the interference information exists in the environment sensing result of the pan terminal, sensing accuracy may be affected. For the interference information that affects the sensing, invader shielding and target protection may be performed by using the sensing resource management center, to improve the sensing accuracy of the target.

Figure 8:
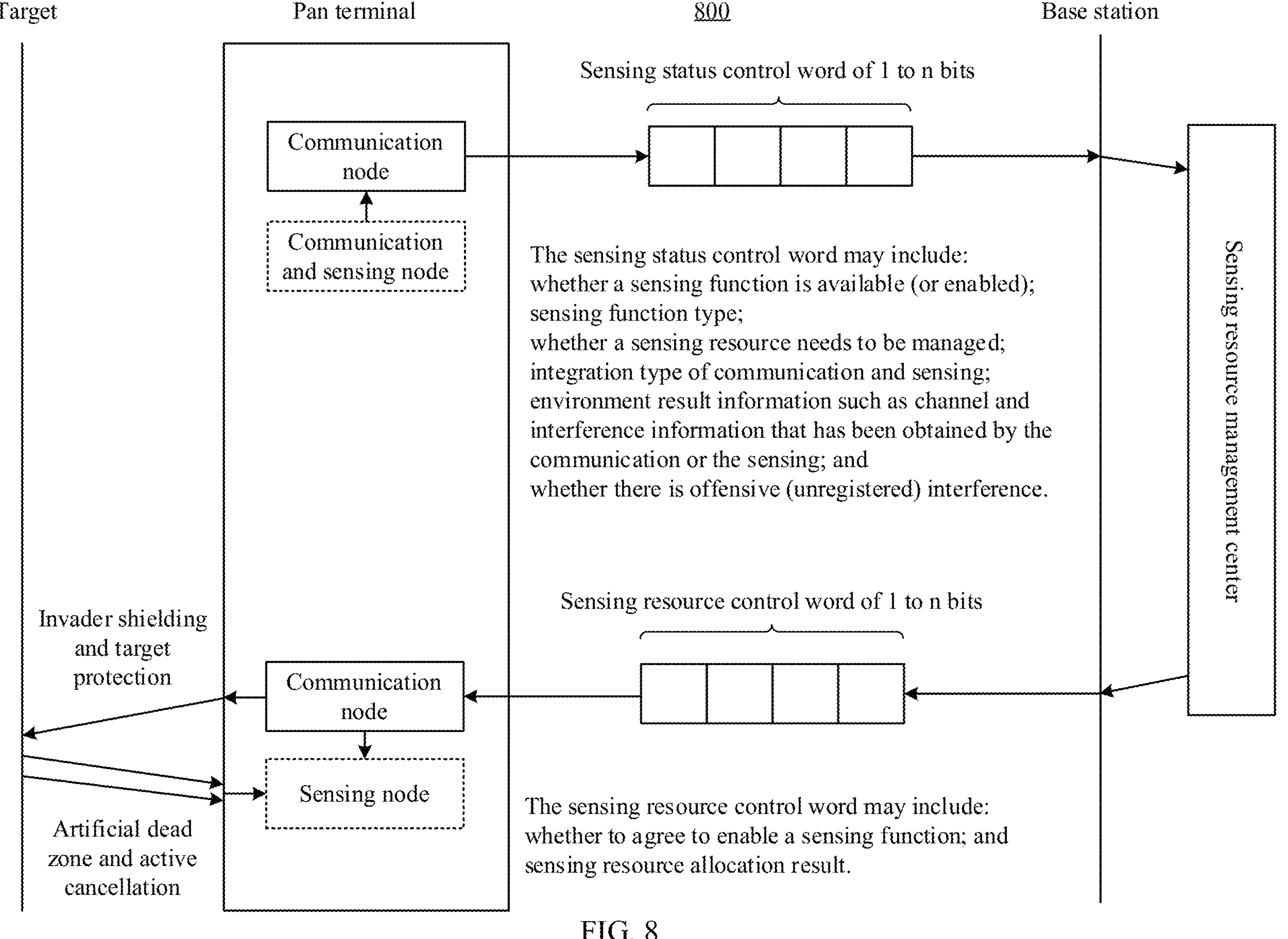
FIG. 8 is a schematic interaction diagram of another sensing signal transmission method according to an embodiment of this application.

Based on the foregoing descriptions of FIG. 7, FIG. 8 further describes the invader shielding and the target protection that may be performed for the interference information. For example, FIG. 8 is a schematic interaction diagram of another sensing signal transmission method according to an embodiment of this application. As shown in FIG. 8, the signaling interaction process thereof is described in FIG. 7. Details are not described herein again. As shown in FIG. 8, when the interference information exists in the environment sensing result of the pan terminal, an artificial dead zone technology and an active cancellation technology may be used to perform the invader shielding and the target protection.

The active cancellation technology is a type of signal blanking method to reduce an echo intensity received by a radar receiver through coherent spoofing. The technology mainly uses coherent means to enable a target scattered field and an artificially introduced radiation field to cancel each other out in a direction of the radar, so that the radar receiver is always at a null of a synthesized direction pattern. This suppresses radar receiving of a target transmit echo.

The artificial dead zone means to change a directivity function of the radar by using an active transmission system to transmit a coherent wave signal and through interference effect of the wave, to split a transmit beam of an antenna, so as to create an artificial dead zone in a specified target area and effectively reduce an irradiation power density and an effective receiving area of the radar. This reduces a detection range of the radar.

In an optional embodiment, the first message may further include information indicating that the terminal device has a sensing function.

In an embodiment of the application, the indication information indicating that the terminal device has the sensing function may be used by the network device to specify the terminal device on which resource management may need to be performed. In this way, time overheads and computing overheads of the network device can be reduced.

In an optional embodiment, the first message may further include information used by the terminal device to request to enable the sensing function.

In an embodiment of the application, after receiving the information that is in the first message and that is used to request to enable the sensing function, the network device may calculate overheads currently used for the environment sensing, to determine whether to allow the terminal device to enable the sensing function.

In an optional embodiment, when the overheads currently used by the network device for the environment sensing are loaded, the network device may reject the request of the terminal device to enable the sensing function. In this way, load pressure of the network device can be relieved.

For example, if the network device rejects the request of the terminal device to enable the sensing function, the network device may not send any message to the terminal device, or may send a fourth message to the terminal device. The fourth message includes information indicating that the network device rejects the terminal device to enable the sensing function.

In an optional embodiment, the second message may further include information indicating that the network device allows the terminal device to enable the sensing function.

In an embodiment of the application, the network device may notify, by sending the allocated sensing resource to the terminal device, the terminal device that the network device allows the terminal device to enable the sensing function.

In an embodiment, the second message may also carry an instruction indicating that the network device allows the terminal device to enable the sensing function. After receiving the instruction to enable the sensing function, the terminal device receives the sensing resource allocated by the network device to the terminal device.

In an optional embodiment, the first message may further include interference information and a category of the interference information.

In an embodiment of the application, the interference information may be classified into intra-system interference and/or inter-system interference based on the category. For example, an LTE system is used as an example. The intra-system interference is usually co-channel interference, that is, interference generated by a terminal device that uses a same frequency resource in a neighboring cell in the LTE system. The inter-system interference is usually inter-frequency interference, that is, interference generated by a terminal device that uses another frequency, for example, a broadcast television signal or a vehicle-mounted radar signal. When these signals are transmitted on a specified channel, a part of power is leaked to a frequency used by a terminal device in the LTE system, thereby generating the inter-system interference. The 5G system is in a similar case.

In addition, the interference information may be further classified into offensive interference and non-offensive interference based on the category. The offensive interference is an interference signal sent by a terminal device that is not registered with the network device, and the non-offensive interference is an interference signal sent by a terminal device that is registered with the network device. For example, the radar 313 shown in FIG. 3 is not registered with the base station 311. Therefore, a signal sent by the radar 313 is the offensive interference for all terminal devices in the integrated sensing and communication network 300.

In an optional embodiment, after receiving the interference information and the category of the interference information in the first message, the network device performs corresponding interference cancellation based on the category of the interference information. For example, the active cancellation technology and the artificial dead zone technology may be used to perform the interference cancellation.

In an optional embodiment, the terminal device sends a third message to the network device, where the third message includes information indicating whether the terminal device has a sensing receiver. In this way, the network device may manage a corresponding frame structure for the terminal device based on whether the terminal device has the sensing receiver.

It should be understood that whether the terminal device has the sensing receiver described in an embodiment of the application refers to whether the terminal device has a sensing receiving module or a sensing receiving unit dedicated to the sensing. When the terminal device does not have the sensing receiver, another manner may still be used to complete the sensing function. For example, the sensing function may be completed by using a receiver that is used for communication and that is described below.

In an optional embodiment, when a one-way propagation delay $T_r$ of the sensing signal is greater than a one-way propagation delay $T_c$ of a communication signal, the sensing resource allocated to the terminal device includes a first frame structure, a sensing window of an uplink frame in the first frame structure is used to transmit the sensing signal, a length L of the sensing window meets $2(T_r-T_c)\leq L\leq M$, and M is a length of the uplink frame.

It should be understood that a length S of the sensing signal meets $S\leq L$, and in addition to being used to transmit the sensing signal, the sensing window may further transmit other types of signals, for example, a pilot signal or an orthogonal frequency division multiplexing symbol. This is not limited in an embodiment of the application. In an embodiment, various types of signals may be used to complete the task of sensing the target, and a sensing result is transmitted in the sensing window.

In an embodiment of the application, the sensing receiver may be configured to receive the sensing signal at a full range. That is, whether $T_r>T_c$ or $T_r\leq T_c$, the terminal device having the sensing receiver can receive the sensing signal.

In an embodiment, when the terminal device has the sensing receiver, the terminal device may choose not to enable a receiving function of the sensing receiver, and still transmit the sensing signal in a position of the sensing window of the uplink frame. In this way, the sensing signal can be efficiently transmitted, and hardware overheads can be reduced.

In the integrated sensing and communication network, if the terminal device is the integrated communication and sensing node of the first integration type, the communication node and the sensing node multiplex the time-frequency-space resources, and when the receiving and sending of the sensing node are located in the same geographical location, the network device needs to manage a frame structure in a resource allocation result based on the first message, to transmit the sensing signal.

Figure 9:
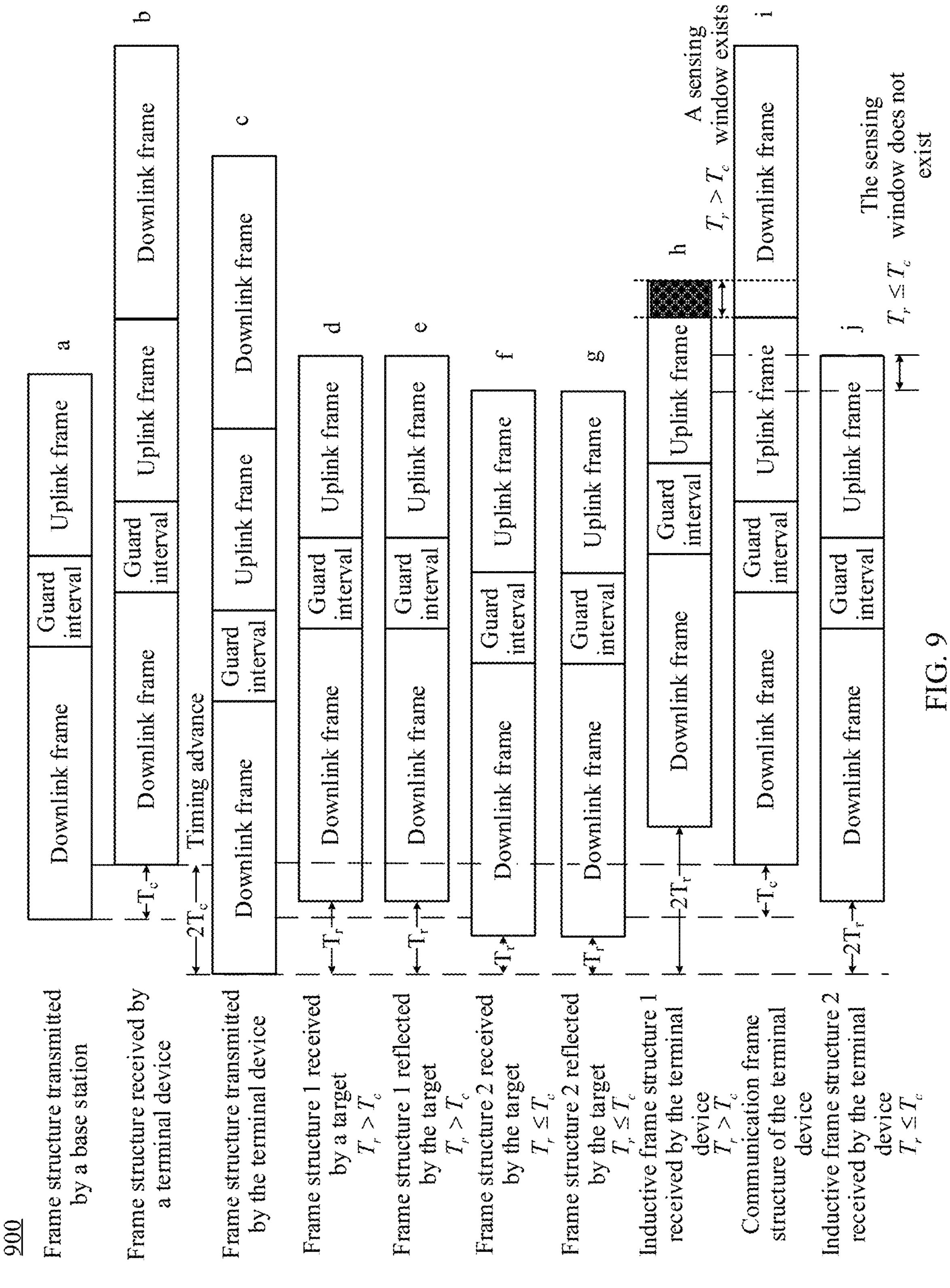
FIG. 9 is a schematic diagram of a frame structure corresponding to sensing signal transmission according to an embodiment of this application.

For example, FIG. 9 is a schematic diagram of a frame structure corresponding to sensing signal transmission according to an embodiment of this application. In FIG. 9, communication is in a time division duplex (TDD) mode, an integrated communication and sensing node is a terminal device, and the terminal device does not have a sensing receiver. The following is a schematic diagram of a frame structure at two sensing ranges, which are $T_r>T_c$ and $T_r\leq T_c$.

In a communication process, a base station sends a frame structure a to the terminal device, and the terminal device receives a frame structure b after a $T_c$ delay. To ensure time synchronization, the terminal device sends a frame structure c to the base station in advance of a timing advance (TA) of $2T_c$. In this way, a communication frame structure i of the terminal device is obtained after another $T_c$ delay.

In addition, when $T_r>T_c$, because the terminal device is the integrated communication and sensing node, uplink data sent by the terminal device is also used to sense a target. After the terminal device sends the frame structure c, the target receives a frame structure d after a $T_r$ delay. After the frame structure d reaches the target, the terminal device receives, after a $T_r$ delay, a frame structure e reflected by the target. In this way, a total of $2T_r$ delay is required from sending to receiving of a sensing frame structure h by the terminal device.

When receiving a downlink frame in the frame structure i sent by the base station, the terminal device also receives a sensing signal (that is, uplink data in the frame structure h) in the sensing frame structure h. It should be understood that because the uplink data is reflected back after reaching the target and is used as the sensing signal, the sensing signal is actually the uplink data sent by the terminal device. When $T_r>T_c$, and there is no sensing receiver, there is a part (as shown by a shaded part in the frame structure h) in which the sensing signal and the downlink frame in the frame structure i received by the terminal device overlap in terms of time, and the overlapping part is a sensing window. A length L of the sensing window meets $2(T_r-T_c)\leq L\leq M$, and M is a length of the uplink frame. Therefore, the sensing signal may be transmitted in a position of the sensing window, and the sensing signal may be received by using a receiver that is in the terminal device and that is used for communication.

Similarly, when $T_r\leq T_c$, after the terminal device sends the frame structure c, a target receives a frame structure f after a $T_r$ delay, and after the frame structure f reaches the target, the terminal device receives, after $T_r$ time, a frame structure g reflected back by the target. In this way, a total of $2T_r$ delay is required from sending to receiving of a sensing frame structure j by the terminal device.

When receiving the downlink frame in the frame structure i sent by the base station, the terminal device also receives a sensing signal (that is, an uplink frame in the frame structure j) in the sensing frame structure j. When $T_r\leq T_c$, and there is no sensing receiver, there is no time overlapping part between the sensing signal and the downlink frame in the frame structure i received by the terminal device. Therefore, there is no sensing window.

FIG. 9 describes frame structure management processes corresponding to the two different sensing ranges (that is, $T_r>T_c$, and $T_r\leq T_c$) by using an example in which the terminal device does not have the sensing receiver. When the integrated communication and sensing node is the terminal device, and the terminal device does not have the sensing receiver, the sensing window exists in the uplink frame sent by the terminal device, and may be used to transmit the sensing signal. In this case, the terminal device may perform long-range sensing (that is, $T_r>T_c$) and detect a target beyond a communication range. However, when $T_r\leq T_c$, there is no sensing window in the uplink frame sent by the terminal device, and short-range sensing cannot be performed. Therefore, the sensing receiver needs to be used to receive the sensing signal.

Figure 10:
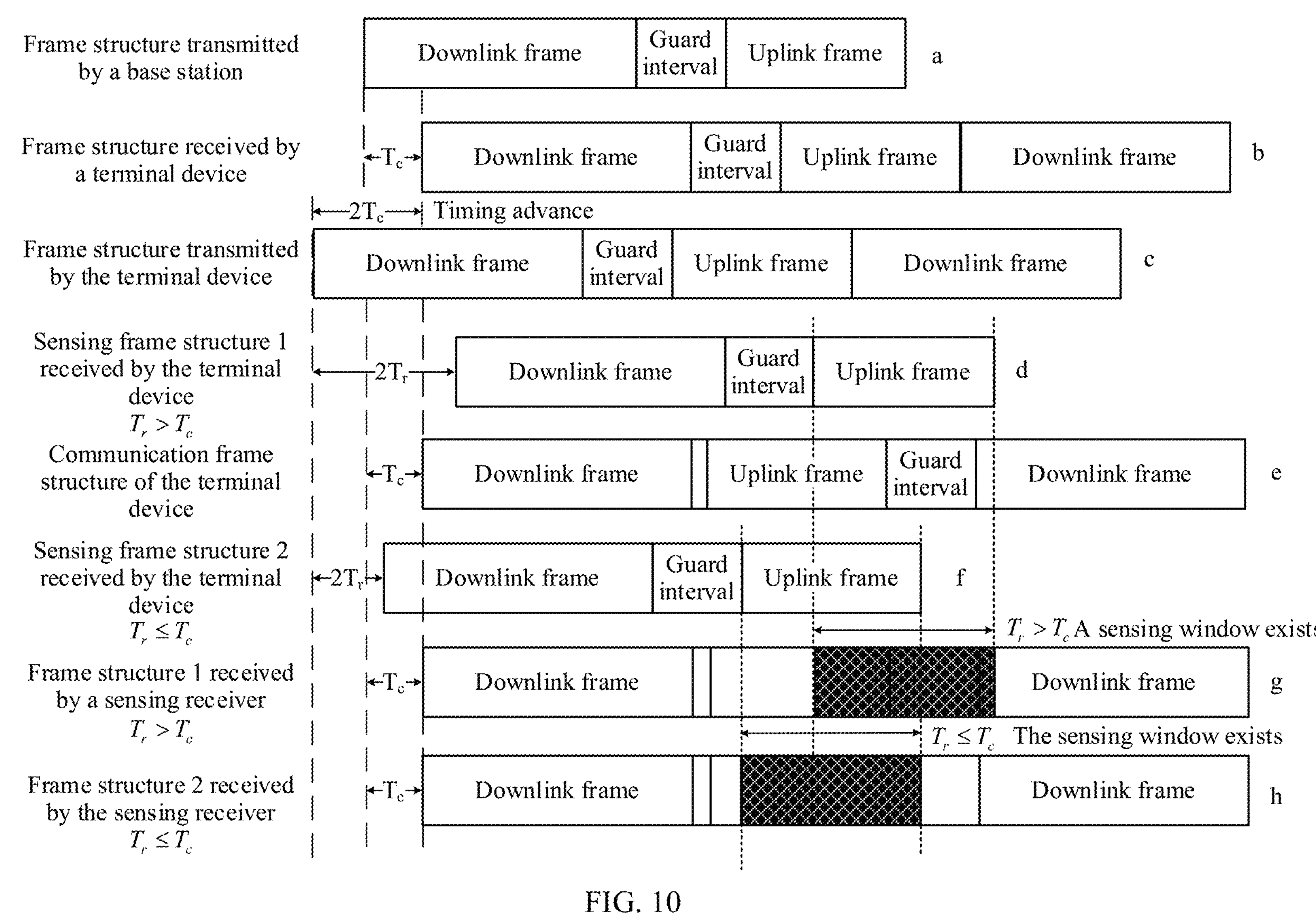
FIG. 10 is a schematic diagram of a frame structure corresponding to other sensing signal transmission according to an embodiment of this application.

In view of this, FIG. 10 is used as an example below to describe in detail frame structure management processes corresponding to two different sensing ranges when the terminal device has a sensing receiver.

For example, FIG. 10 is a schematic diagram of a frame structure corresponding to other sensing signal transmission according to an embodiment of this application. In FIG. 10, communication is in a TDD mode, an integrated communication and sensing node is a terminal device, and the terminal device has the sensing receiver. The following is a schematic diagram of a frame structure at two sensing ranges, which are $T_r>T_c$ and $T_r\leq T_c$.

In a communication process, a base station sends a frame structure a to the terminal device, and the terminal device receives a frame structure b after a $T_c$ delay. To ensure time synchronization, the terminal device sends a frame structure c to the base station in advance of a TA of $2T_c$. In this way, a communication frame structure e of the terminal device is obtained after another $T_c$ delay.

In addition, when $T_r>T_c$, because the terminal device is the integrated communication and sensing node, uplink data sent by the terminal device is also used to sense a target. After the terminal device sends the frame structure c, the terminal device receives an inductive frame structure d after a $2T_r$ delay. When receiving a downlink frame in the communication frame structure e, the terminal device also receives a sensing signal (that is, uplink data in the frame structure d) in the sensing frame structure d.

When the terminal device has the sensing receiver, the sensing receiver may be used to receive a sensing signal beyond a communication range (that is, $T_r>T_c$). In this case, a sensing window (as shown by a shaded part in a frame structure g) exists in the frame structure g received by the sensing receiver, and a length of the sensing window is equal to a length of an uplink frame in the sensing frame structure d received by the terminal device. The terminal device needs to vacate a slot for transmitting the uplink data, to transmit the sensing signal.

Similarly, when $T_r\leq T_c$, because the terminal device is the integrated communication and sensing node, uplink data sent by the terminal device is also used to sense a target. After the terminal device sends the frame structure c, the terminal device receives a sensing frame structure f after a $2T_r$ delay.

When receiving the downlink frame in the communication frame structure e, the terminal device also receives a sensing signal (that is, uplink data in the frame structure d) in the sensing frame structure f. When the terminal device has the sensing receiver, the sensing receiver may be used to receive a sensing signal (that is, $T_r\leq T_c$) within the communication range. In this case, a sensing window (as shown by a shaded part in a frame structure h) exists in the frame structure h received by the sensing receiver, and a length of the sensing window is equal to a length M of an uplink frame in the sensing frame structure f received by the terminal device. The terminal device needs to vacate a slot for transmitting the uplink data, to transmit the sensing signal.

In an embodiment, when the terminal device has the sensing receiver, the terminal device may choose not to enable a receiving function of the sensing receiver, and still transmit the sensing signal in the manner shown in FIG. 7.

In the frame structure management process shown in FIG. 8, when the terminal device has the sensing receiver, the sensing receiver may receive sensing information at a full range without affecting communication uplink and downlink data transmission rates.

In FIG. 9 and FIG. 10, an example in which the integrated communication and sensing node is the terminal device is used to describe the frame structure management processes when there is the sensing receiver and there is not the sensing receiver. The following describes in detail a frame structure management process when the integrated communication and sensing node is a network device with reference to FIG. 11 and FIG. 12.

Figure 11:
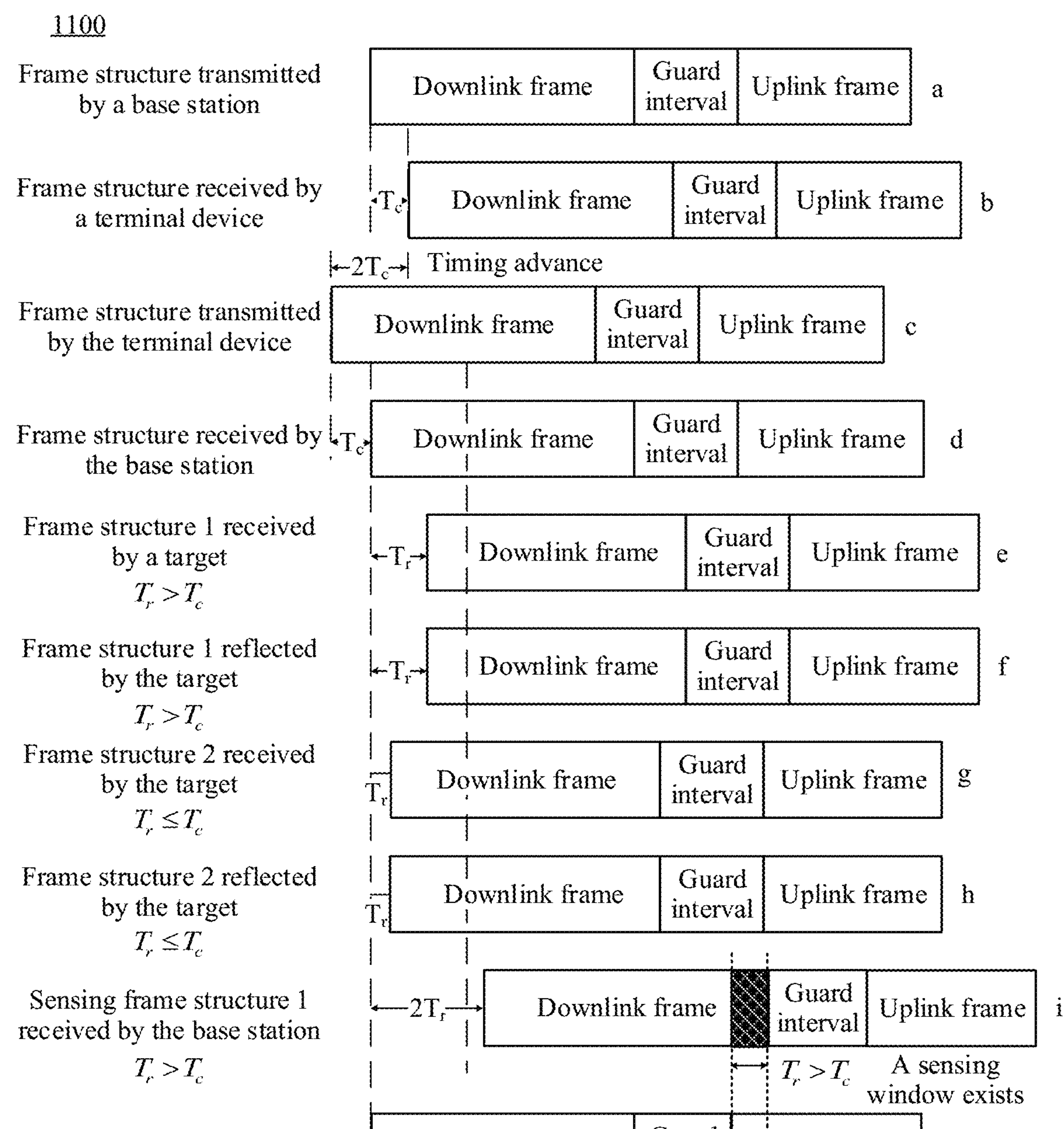
FIG. 11 is a schematic diagram of a frame structure corresponding to yet other sensing signal transmission according to an embodiment of this application.

For example, FIG. 11 is a schematic diagram of a frame structure corresponding to yet other sensing signal transmission according to an embodiment of this application. In FIG. 11, communication is in a TDD mode, an integrated communication and sensing node is a base station, and the base station does not have a sensing receiver. The following is a schematic diagram of a frame structure at two sensing ranges which are $T_r>T_c$ and $T_r\leq T_c$.

It should be understood that that the base station described in an embodiment of the application does not have the sensing receiver means that the base station does not have a sensing receiving module or a sensing receiving unit dedicated to sensing. When the base station does not have the sensing receiver, another manner may still be used to complete a sensing function. For example, the sensing function may be completed by using a receiver that is in the base station and that is used for communication and that is described in this embodiment.

In a communication process, the base station sends a frame structure a to a terminal device, and the terminal device receives a frame structure b after a $T_c$ delay. To ensure time synchronization, the terminal device sends a frame structure c to the base station in advance of a TA of $2T_c$, and the base station receives a frame structure d after another $T_c$ delay. In this way, a communication frame structure j of the base station may be obtained.

In addition, when $T_r>T_c$, because the base station is the integrated communication and sensing node, downlink data sent by the base station is also used to sense a target. After the base station sends the frame structure a, the target receives a frame structure e after a $T_r$ delay, and the base station receives, after another $T_r$ delay, a frame structure f reflected back by the target. In this way, a total of $2T_r$ delay is required from sending to receiving of a sensing frame structure i by the base station.

When receiving uplink data in the frame structure c sent by the terminal device, the base station also receives a sensing signal (that is, downlink data in the frame structure i) in the sensing frame structure i. It should be understood that because the downlink data is reflected back after reaching the target and is used as the sensing signal, the sensing signal is actually the downlink data sent by the base station. When $T_r>T_c$, and there is no sensing receiver, there is a part (as shown by a shaded part in the frame structure i) in which the sensing signal and an uplink frame in the communication frame structure j of the base station overlap in terms of time, and the overlapping part is a sensing window. A length L of the sensing window meets $2(T_c-T_r)+T_{switch}\leq L\leq N$, N is a length of a downlink frame, and $T_{switch}$ is switching time required for switching from the downlink frame to the uplink frame. Therefore, the sensing signal may be transmitted in a position of the sensing window, and the sensing signal may be received by using the receiver that is in the base station and that is used for communication.

In an embodiment of the application, when the integrated communication and sensing node is the base station, and the base station does not have the sensing receiver, the base station first informs the terminal device of delaying sending the uplink data, and the base station may receive, after the sensing signal is transmitted in the sensing window, the uplink data sent by the terminal device. In this way, transmission efficiency of the sensing signal can be improved, and hardware overheads can be reduced because no additional sensing receiver is required.

Similarly, when $T_r\leq T_c$, after the base station sends the frame structure a, a target receives a frame structure g after a $T_r$ delay, and the base station receives, after another $T_r$ delay, a frame structure h reflected back by the target. In this way, a total of $2T_r$ delay is required from sending to receiving of a sensing frame structure k by the base station.

When receiving the uplink data in the frame structure c sent by the terminal device, the base station also receives a sensing signal (that is, downlink data in the frame structure k) in the sensing frame structure k. It should be understood that because the downlink data is reflected back after reaching the target and is used as the sensing signal, the sensing signal is actually the downlink data sent by the base station. When $T_r\leq T_c$, and there is no sensing receiver, there is part in which the sensing signal and the uplink frame in the communication frame structure j of the base station overlap in terms of time. Therefore, there is no sensing window that can be used to transmit the sensing signal.

FIG. 11 describes frame structure management processes corresponding to the two different sensing ranges (that is, $T_r>T_c$ and $T_r\leq T_c$) by using an example in which the base station does not have the sensing receiver. It can be learned from FIG. 11 that, when the integrated communication and sensing node is the base station, and the base station does not have the sensing receiver, the sensing window exists in the downlink frame sent by the base station, and may be used to transmit the sensing signal. In this case, the base station may perform long-range sensing (that is, $T_r>T_c$) and detect a target beyond a communication range. However, when $T_r\leq T_c$, there is no sensing window that can be used to transmit the sensing signal, short-range sensing cannot be performed. Therefore, the sensing receiver needs to be used to receive the sensing signal.

Figure 12:
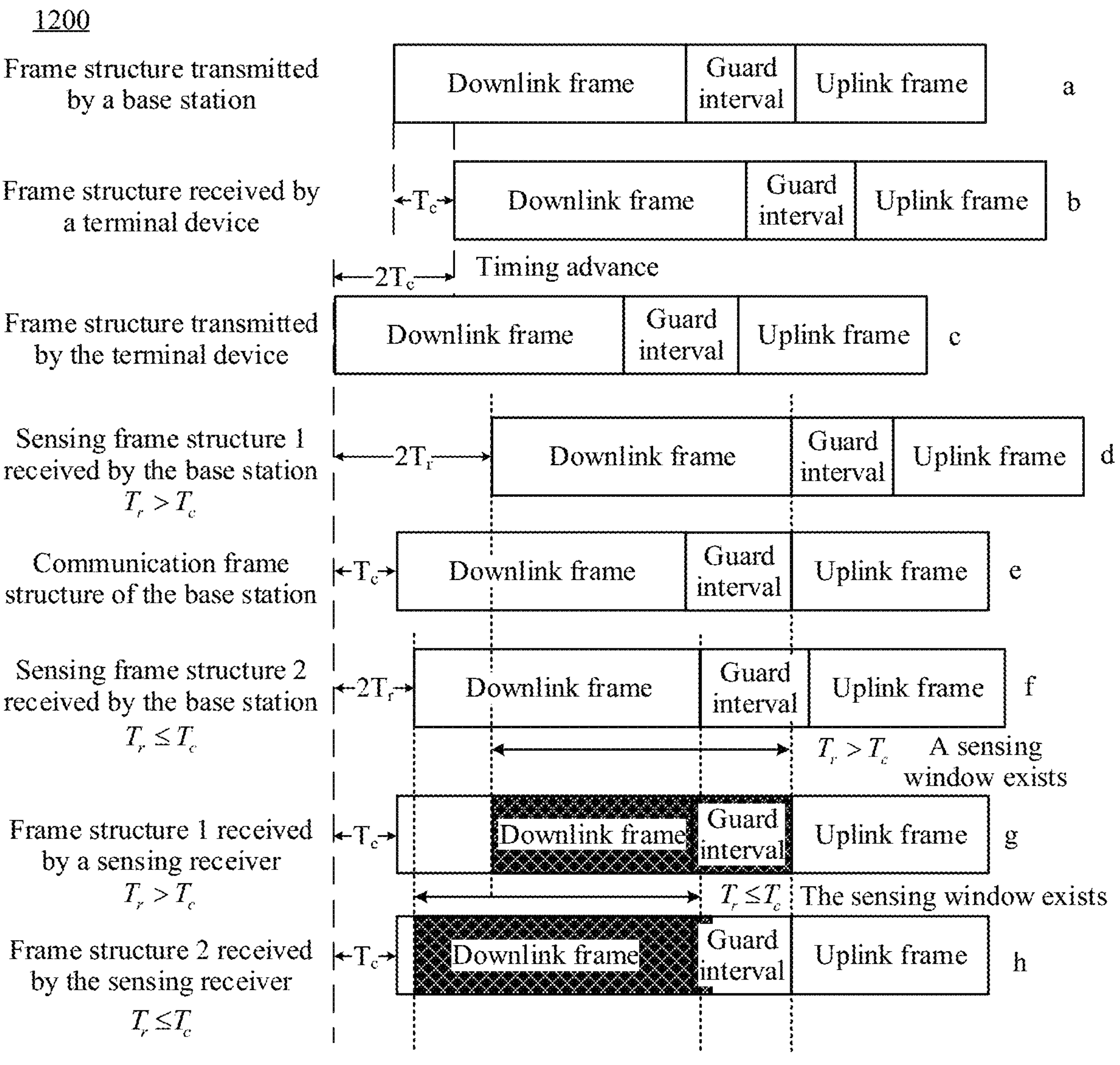
FIG. 12 is a schematic diagram of a frame structure corresponding to still other sensing signal transmission according to an embodiment of this application.

In view of this, FIG. 12 is used as an example below to describe in detail frame structure management processes corresponding to two different sensing ranges when the base station has a sensing receiver.

It should be understood that that the base station described in an embodiment of the application has the sensing receiver means that the base station has a sensing receiving module or a sensing receiving unit dedicated to sensing. When the base station has the sensing receiver, the sensing receiver may be used to complete a sensing function.

For example, FIG. 12 is a schematic diagram of a frame structure corresponding to still other sensing signal transmission according to an embodiment of this application. In FIG. 12, communication is in a TDD mode, an integrated communication and sensing node is a base station, and the base station has a sensing receiver. The following is a schematic diagram of a frame structure at two sensing ranges, which are $T_r>T_c$ and $T_r\leq T_c$.

In a communication process, the base station sends a frame structure a to a terminal device, and the terminal device receives a frame structure b after a $T_c$ delay. To ensure time synchronization, the terminal device sends a frame structure c to the base station in advance of a TA of $2T_c$, and the base station receives a frame structure d after another $T_c$ delay. In this way, a communication frame structure j of the base station may be obtained.

In addition, when $T_r>T_c$, because the base station is the integrated communication and sensing node, downlink data sent by the base station is also used to sense a target. Therefore, when receiving an uplink frame in the communication frame structure e, the base station also receives, after a $2T_r$ delay, a sensing signal (that is, downlink data in the frame structure d) in the sensing frame structure d.

When the base station has the sensing receiver, the sensing receiver may be used to receive a sensing signal (that is, $T_r>T_c$) beyond a communication range. In this case, a sensing window (as shown by a shaded part in a frame structure g) exists in the frame structure g received by the sensing receiver, and a length of the sensing window is equal to a length of a downlink frame in the sensing frame structure d received by the base station. The base station needs to vacate a slot for transmitting the downlink data, to transmit the sensing signal.

Similarly, when $T_r\leq T_c$, because the base station is the integrated communication and sensing node, downlink data sent by the base station is also used to sense a target. Therefore, when receiving the uplink frame in the communication frame structure e, the base station also receives, after a $2T_r$ delay, a sensing signal (that is, downlink data in a frame structure f) in the sensing frame structure f.

When the base station has the sensing receiver, the sensing receiver may be used to receive a sensing signal (that is, $T_r\leq T_c$) within the communication range. In this case, a sensing window (as shown by a shaded part in a frame structure h) exists in the frame structure h received by the sensing receiver, and a length of the sensing window is equal to a length N of a downlink frame in the sensing frame structure f received by the base station. The base station needs to vacate a slot for transmitting the downlink data, to transmit the sensing signal.

In the foregoing descriptions in FIG. 9 to FIG. 12, regardless of whether the integrated communication and sensing node is the terminal device or the base station, both receiving and sending of the sensing signal belong to a monostatic networking mode. In addition, the sensing signal may alternatively be received in a bistatic or distributed networking mode. This is not limited in embodiments of this application.

Figure 13:
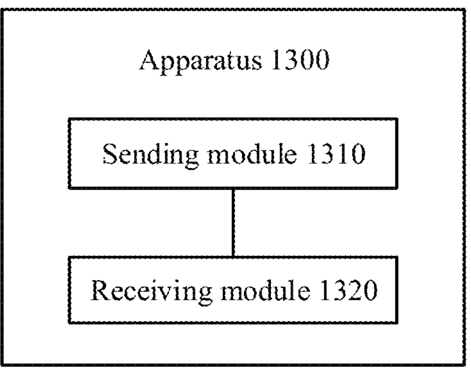
FIG. 13 is a schematic block diagram of a sensing signal transmission apparatus according to an embodiment of this application.

FIG. 13 is a schematic block diagram of a sensing signal transmission apparatus 1300 according to an embodiment of this application. The apparatus 1300 may be a terminal device or a chip in the terminal device. The apparatus 1300 includes a sending module 1310 and a receiving module 1320.

The sending module 1310 is configured to send a first message to a network device, where the first message includes information for requesting the network device to allocate a sensing resource to the apparatus. The receiving module 1320 is configured to receive a second message from the network device, where the second message includes the sensing resource allocated to the terminal device. The sending module 1310 is further configured to send a sensing signal on the allocated sensing resource.

In an embodiment, the first message further includes information indicating that the apparatus has a sensing function.

In an embodiment, the second message further includes information indicating that the network device allows the apparatus to enable the sensing function.

In an embodiment, the first message further includes interference information and a category of the interference information.

In an embodiment, when a one-way propagation delay $T_r$ of the sensing signal is greater than a one-way propagation delay $T_c$ of a communication signal, the sensing resource allocated to the apparatus includes a first frame structure, a sensing window of an uplink frame in the first frame structure is used to transmit the sensing signal, a length L of the sensing window meets $2(T_r-T_c)\leq L\leq M$, and M is a length of the uplink frame.

In an embodiment, the sending module 1310 is configured to send a third message to the network device, where the third message includes information indicating whether the apparatus has a sensing receiver.

In an optional example, one of ordinary skilled in the art may understand that the apparatus 1300 may be an application of the terminal device in the foregoing embodiments, or functions of the application of the terminal device in the foregoing embodiments may be integrated into the apparatus 1300. The function may be implemented by using hardware, or may be implemented by using hardware executing corresponding software. The hardware or the software includes one or more modules corresponding to the function. For example, the receiving module 1320 may be a communication interface, for example, a transceiver interface. The apparatus 1300 may be configured to perform the procedures and/or operations corresponding to the application of the terminal device in the foregoing method embodiments.

Figure 14:
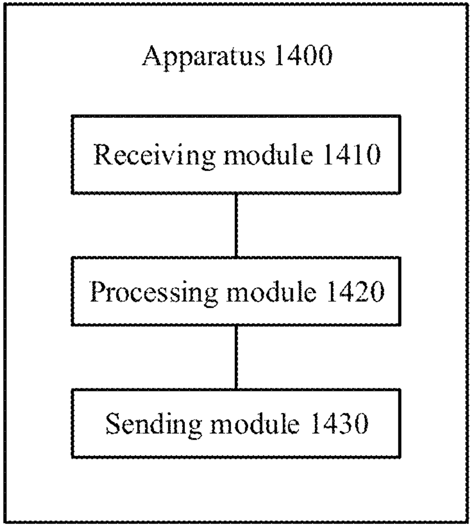
FIG. 14 is a schematic block diagram of another sensing signal transmission apparatus according to an embodiment of this application.

FIG. 14 is a schematic block diagram of another sensing signal transmission apparatus 1400 according to an embodiment of this application. The apparatus 1400 may be a network device, or may be a chip in the network device. The apparatus 1400 includes a receiving module 1410, a processing module 1420, and a sending module 1430.

The receiving module 1410 is configured to receive a first message from a terminal device, where the first message includes information for requesting the apparatus to allocate a sensing resource to the terminal device. The processing module 1420 is configured to allocate the sensing resource to the terminal device based on the first message. The sending module 1430 is configured to send a second message to the terminal device, where the second message includes the sensing resource allocated to the terminal device.

In an embodiment, the first message further includes information indicating that the apparatus has a sensing function.

In an embodiment, the second message further includes information indicating that the network device allows the apparatus to enable the sensing function.

In an embodiment, the first message further includes interference information and a category of the interference information.

In an embodiment, when a one-way propagation delay $T_r$ of a sensing signal is greater than a one-way propagation delay $T_c$ of a communication signal, the sensing resource allocated to the apparatus includes a first frame structure, a sensing window of an uplink frame in the first frame structure is used to transmit the sensing signal, a length L of the sensing window meets $2(T_r-T_c)\leq L\leq M$, and M is a length of the uplink frame.

In an embodiment, the receiving module 1410 is configured to receive a third message from the terminal device, where the third message includes information indicating whether the terminal device has a sensing receiver.

In an optional example, one of ordinary skilled in the art may understand that the apparatus 1400 may be the network device in the foregoing embodiments, or functions of the network device in the foregoing embodiments may be integrated into the apparatus 1400. The function may be implemented by using hardware, or may be implemented by using hardware executing corresponding software. The hardware or the software includes one or more modules corresponding to the function. For example, the receiving module 1410 may be a communication interface, for example, a transceiver interface. The apparatus 1400 may be configured to perform the procedures and/or operations corresponding to the network device in the foregoing method embodiments.

It should be understood that the apparatus 1300 and the apparatus 1400 herein are implemented in a form of a functional module. The term "module" herein may be an application-specific integrated circuit (ASIC), an electronic circuit, a processor (for example, a shared processor, a dedicated processor, or a group processor) configured to execute one or more software or firmware programs, a memory, a merged logic circuit, and/or another appropriate component that supports the described function.

In embodiments of this application, the apparatus 1300 and the apparatus 1400 in FIG. 13 and FIG. 14 may alternatively be a chip or a chip system, for example, a system on chip (SoC). Correspondingly, the receiving module 1410 may be a transceiver circuit of the chip. This is not limited herein.

It should be understood that the sensing receiver described above may be integrated into the apparatus 1300 (the apparatus 1300 is embodied as a terminal device) shown in FIG. 13 and/or the apparatus 1400 (the apparatus 1400 is embodied as a network device) shown in FIG. 14, or may exist independently. The sensing receiver is coupled to the apparatus 1300 and/or the apparatus 1400 through a transmission line or in a wireless manner.

Figure 15:
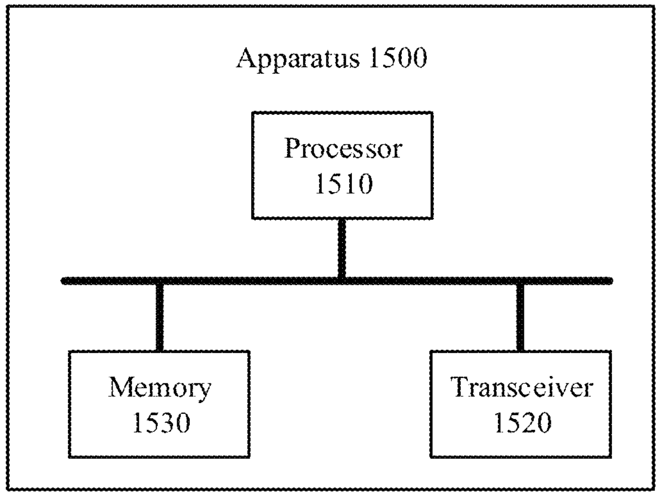
FIG. 15 is a schematic block diagram of yet another sensing signal transmission apparatus according to an embodiment of this application.

FIG. 15 is a schematic block diagram of yet another sensing signal transmission apparatus 1500 according to an embodiment of this application. The apparatus 1500 includes a processor 1510, a transceiver 1520, and a memory 1530. The processor 1510, the transceiver 1520, and the memory 1530 communicate with each other through an internal connection path. The memory 1530 is configured to store instructions. The processor 1510 is configured to execute the instructions stored in the memory 1530, to control the transceiver 1520 to send a signal and/or receive a signal.

It should be understood that, the apparatus 1500 may be the terminal device or the network device in the foregoing embodiments, or functions of the terminal device or the network device in the foregoing embodiments may be integrated into the apparatus 1500. The apparatus 1500 may be configured to perform the operations and/or procedures corresponding to the terminal device or the network device in the foregoing method embodiments. In an embodiment, the memory 1530 may include a read-only memory and a random access memory, and provide the instructions and data for the processor. A part of the memory may further include a non-volatile random access memory. For example, the memory may further store information of a device type. The processor 1510 may be configured to execute the instructions stored in the memory, and when the processor executes the instructions, the processor may perform the operations and/or procedures corresponding to the terminal device or the network device in the foregoing method embodiments.

It should be understood that in embodiments of this application, the processor 1510 may be a central processing unit (CPU), or the processor may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor, or the like.

In an embodiment, the operations in the foregoing methods can be implemented by using a hardware integrated logical circuit in the processor or by using instructions in a form of software. The operations of the methods disclosed with reference to embodiments of this application may be directly performed by a hardware processor, or may be performed by a combination of hardware in the processor and a software module. The software module may be located in a mature storage medium in the field, such as a random access memory, a flash memory, a read-only memory, a programmable read-only memory, an electrically erasable programmable memory, or a register. The storage medium is located in the memory, and a processor executes instructions in the memory and completes the operations in the foregoing methods in combination with hardware of the processor. To avoid repetition, details are not described herein again.

This application further provides a communication apparatus on a terminal device side. The communication apparatus includes a communication interface and a logic circuit. The communication interface is configured to send a first message and/or receive a second message, and the logic circuit is configured to obtain an allocated sensing resource based on the second message, to perform the method according to any one of the possible implementations of the first aspect.

This application further provides a communication apparatus on a network device side. The communication apparatus includes a communication interface and a logic circuit. The communication interface is configured to receive a first message and/or send a second message, and the logic circuit is configured to allocate a sensing resource based on the first message, to perform the method according to any one of the possible implementations of the second aspect.

An embodiment of this application further provides a communication system. The communication system may include the terminal device (the apparatus 1300 is embodied as the terminal device) shown in FIG. 13.

An embodiment of this application further provides a communication system. The communication system includes the network device (the apparatus 1400 is embodied as the network device) shown in FIG. 14.

An embodiment of this application further provides a communication system. The communication system may include the terminal device (the apparatus 1500 is embodied as the terminal device) shown in FIG. 15 or the network device (the apparatus 1500 is embodied as the network device) shown in FIG. 15.

It may be clearly understood by one of ordinary skilled in the art that, for the purpose of convenient and brief description, for a detailed working process of the foregoing system, apparatus, and module, refer to a corresponding process in the foregoing method embodiments, and details are not described herein again.

One of ordinary skilled in the art may be aware that, modules and algorithm operations in the examples described with reference to embodiments disclosed in this specification can be implemented by electronic hardware or a combination of computer software and electronic hardware. Whether these functions are performed by hardware or software depends on particular applications and design constraints of the technical solutions. One of ordinary skilled in the art may use different methods to implement the described functions for each particular application, but it should not be considered that the implementation goes beyond the scope of this application.

One of ordinary skill in the art may understand that various numbers such as "first" and "second" in this application are merely used for differentiation for ease of description, and are not used to limit the scope of embodiments of this application or represent a sequence.

It may be clearly understood by one of ordinary skilled in the art that, for the purpose of convenient and brief description, for a detailed working process of the foregoing system, apparatus, and module, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the modules is merely logical function division and may be other division in an actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network modules. Some or all of the modules may be selected based on actual requirements to achieve the objectives of the solutions of embodiments.

In addition, functional modules in this application may be integrated into one processing module, each of the modules may exist alone physically, or two or more modules are integrated into one module.

When the functions are implemented in the form of a software functional module and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the operations of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely implementations of this application, but are not intended to limit the protection scope of this application. Any variation or replacement readily figured out by one of ordinary skilled in the art within the technical scope disclosed in this application shall fall within the protection scope of this application. Therefore, the protection scope of this application shall be subject to the protection scope of the claims.

What is claimed is:

1. A sensing signal transmission method, comprising:

sending, by a terminal device, a first message to a network device, wherein the first message comprises information for requesting the network device to allocate a sensing resource to the terminal device;

receiving, by the terminal device, a second message from the network device, wherein the second message comprises the sensing resource allocated to the terminal device; and sending, by the terminal device, a sensing signal on the sensing resource allocated to the terminal device, wherein, when a one-way propagation delay $T_r$ of the sensing signal is greater than a one-way propagation delay $T_c$ of a communication signal, the sensing resource allocated to the terminal device comprises a first frame structure, a sensing window of an uplink frame in the first frame structure is used to send the sensing signal, a length L of the sensing window meets $2(T_r-T_c) \leq L \leq M$, and M is a length of the uplink frame.

2. The method according to claim 1, wherein the first message further indicates that the terminal device has a sensing function.

3. The method according to claim 2, wherein the second message further indicates that the network device allows the terminal device to enable the sensing function.

4. The method according to claim 1, wherein the first message further comprises interference information and a category of the interference information.

5. The method according to claim 1, further comprising:

sending, by the terminal device, a third message to the network device, wherein the third message indicates whether the terminal device has a sensing receiver.

6. The method according to claim 1, wherein a communication interface of the terminal device is configured to send the first message or receive the second message, and a logic circuit of the terminal device is configured to obtain the sensing resource allocated to the terminal device based on the second message.

7. The method according to claim 1, wherein the sensing resource comprises at least one of a hardware resource, a computing resource, a time resource, a space resource, or a frequency resource.

8. A sensing signal transmission method, comprising:

receiving, by a network device, a first message from a terminal device, wherein the first message comprises information for requesting the network device to allocate a sensing resource to the terminal device;

allocating, by the network device, the sensing resource to the terminal device based on the first message; and sending, by the network device, a second message to the terminal device, wherein the second message comprises the sensing resource allocated to the terminal device, wherein, when a one-way propagation delay $T_r$ of a sensing signal is greater than a one-way propagation delay $T_c$ of a communication signal, the sensing resource allocated to the terminal device comprises a first frame structure, a sensing window of an uplink frame in the first frame structure is used by the terminal device to send the sensing signal, a length L of the sensing window meets $2(T_r-T_c) \leq L \leq M$, and M is a length of the uplink frame.

9. The method according to claim 8, wherein the first message further indicates that the terminal device has a sensing function.

10. The method according to claim 9, wherein the second message indicates that the network device allows the terminal device to enable the sensing function.

11. The method according to claim 8, wherein the first message further comprises interference information and a category of the interference information.

12. The method according to claim 8, further comprising:

receiving, by the network device, a third message from the terminal device, wherein the third message indicates whether the terminal device has a sensing receiver.

13. The method according to claim 8, wherein a communication interface of the network device is configured to receive the first message or send the second message, and a logic circuit of the network device is configured to allocate the sensing resource to the terminal device based on the first message.

14. The method according to claim 8, wherein the sensing resource comprises at least one of a hardware resource, a computing resource, a time resource, a space resource, or a frequency resource.

15. A sensing signal transmission apparatus for a terminal device, comprising:

a processor, a memory coupled to the processor to store instructions, which when executed by the processor, cause the processor to:

send a first message to a network device, wherein the first message comprises information for requesting the network device to allocate a sensing resource to the terminal device;

receive a second message from the network device, wherein the second message comprises the sensing resource allocated to the terminal device; and send a sensing signal on the sensing resource allocated to the terminal device, wherein, when a one-way propagation delay $T_r$ of the sensing signal is greater than a one-way propagation delay $T_c$ of a communication signal, the sensing resource allocated to the terminal device comprises a first frame structure, a sensing window of an uplink frame in the first frame structure is used to send the sensing signal, a length L of the sensing window meets $2(T_r-T_c) \leq L \leq M$, and M is a length of the uplink frame.

16. The apparatus according to claim 15, wherein the first message indicates that the terminal device has a sensing function.

17. The apparatus according to claim 16, wherein the second message indicates that the network device allows the terminal device to enable the sensing function.

18. The apparatus according to claim 15, wherein the first message further comprises interference information and a category of the interference information.

19. The apparatus according to claim 15, the memory comprising further instructions, which when executed by the processor, cause the processor to:

send a third message to the network device, wherein the third message comprises information indicating whether the terminal device has a sensing receiver.

20. The apparatus according to claim 15, wherein the sensing resource comprises at least one of a hardware resource, a computing resource, a time resource, a space resource, or a frequency resource.

* * * * *